(12) United States Patent
Koskinen et al.

(10) Patent No.: US 8,532,683 B2
(45) Date of Patent: Sep. 10, 2013

(54) SIMPLE DISTRIBUTED COORDINATION AMONG CELLS TO ACHIEVE EFFICIENT DYNAMIC SINGLE-FREQUENCY NETWORK (SFN) OPERATION

(75) Inventors: Henri Markus Koskinen, Espoo (FI); Hongyuan Chen, Tokyo (JP); Leping Huang, Tokyo (JP); Kodo Shu, Kanagawa (JP); Johanna Katariina Pekonen, Espoo (FI); Demian Martos-Riano, Berlin (DE)

(73) Assignee: Nokia Corporation, Espoo (FI)

( * ) Notice: Subject to any disclaimer, the term of this patent is extended or adjusted under 35 U.S.C. 154(b) by 479 days.

(21) Appl. No.: 12/681,216

(22) PCT Filed: Oct. 1, 2008

(86) PCT No.: PCT/IB2008/053985
§ 371 (c)(1),
(2), (4) Date: Aug. 30, 2010

(87) PCT Pub. No.: WO2009/044345
PCT Pub. Date: Apr. 9, 2009

(65) Prior Publication Data
US 2011/0021224 A1    Jan. 27, 2011

Related U.S. Application Data

(60) Provisional application No. 60/976,690, filed on Oct. 1, 2007.

(51) Int. Cl.
*H04B 7/00* (2006.01)
*H04H 20/71* (2008.01)
*H04H 40/00* (2008.01)

(52) U.S. Cl.
USPC ....... 455/501; 455/3.01; 455/3.06; 455/12.14

(58) Field of Classification Search
USPC .............................. 455/513, 450, 452.1, 436
See application file for complete search history.

(56) References Cited

U.S. PATENT DOCUMENTS 7,885,235 B2 * 2/2011 Mochizuki et al. ........... 370/331
8,195,166 B1 * 6/2012 Oprescu-Surcobe et al. 455/436
(Continued)

FOREIGN PATENT DOCUMENTS

EP    1641189 A1    3/2006
EP    2007 151 A1 * 12/2008
(Continued)

OTHER PUBLICATIONS

3GPP Tdoc R2-062271, "Layer 1 signalling based user detection for LTE MBMS", IPWireless, Sep. 2006.
(Continued)

*Primary Examiner* — Tilahun B Gesesse
(74) *Attorney, Agent, or Firm* — Harrington & Smith

(57) ABSTRACT

A system and method for controlling base stations for multimedia broadcast communications. In one embodiment, a base station includes a reporting subsystem configured to broadcast at least one of a counting report request and a channel quality indictor report request to user equipment in a service area thereof. The reporting subsystem is also configured to process at least one of a counting report and a channel quality indicator report received from the user equipment and provide an activity status report therefrom. The base station also includes a dynamic single frequency network subsystem configured to determine to provide multimedia broadcast and multicast services in the service area thereof as a function of an activity status report from another base station.

21 Claims, 15 Drawing Sheets

(56) References Cited

U.S. PATENT DOCUMENTS

| | | | |
|---|---|---|---|
| 2007/0081481 A1* | 4/2007 | Cai et al. | 370/312 |
| 2008/0076359 A1* | 3/2008 | Charpentier et al. | 455/63.1 |
| 2008/0274759 A1* | 11/2008 | Chen et al. | 455/507 |
| 2012/0082098 A1* | 4/2012 | Oprescu-Surcobe et al. | 370/329 |
| 2012/0163204 A1* | 6/2012 | Oprescu-Surcobe et al. | 370/252 |
| 2012/0170547 A1* | 7/2012 | Oprescu-Surcobe et al. | 370/331 |
| 2012/0170552 A1* | 7/2012 | Oprescu-Surcobe et al. | 370/332 |

FOREIGN PATENT DOCUMENTS

| | | |
|---|---|---|
| EP | 2007151 A | 12/2008 |
| WO | 2008135934 A | 11/2008 |

OTHER PUBLICATIONS

3GPP Tdoc R2-073527, "Handling Mobility of UEs in MBSFN mode", Motorola, Aug. 2007.

3GPP TSG RAN WG3 Meeting #53 R3-061205 Tallinn, Estonia, Aug. 28-Sep. 1, 2006 Source: Mitsubishi Electric Title: SFN-clustered Multicast MBMS.

International Search Report and Written Opinion of the International Searching Authority for PCT Application No. PCT/IB2008/051714, dated Oct. 9, 2008, 12 pages.

3GPP TSG-RAN WG1 #48 R1-070819 Feb. 12-16, 2007 St. Louis, USA Source: QUALCOMM Europe.

3GPP TSG RAN WG3 Meeting #53bis R3-061470 Seoul, South Korea, Oct. 10-13, 2006 Agenda Item: 7.3.3 Source: Panasonic Title: Optimization of Dynamic SFN Document for: Discussion and approval.

TSG-RAN WG3 Meeting #53 Tdoc R3-061202 Tallinn, Estonia, Aug. 28-Sep. 1, 2006 Agenda Item: 12.15.6 Ericsson Title: Contribution on E-MBMS Co-ordination function.

Catt: "Consideration about SFN Management" 3GPP TSG RAN WG3 Meeting #55, Online No. R3-070217, Feb. 16, 2007, 3 pages.

International Search Report and Written Opinion of the International Searching Authority for PCT Application No. PCT/IB2008/053985, dated Jun. 18, 2009, 9 pages.

Ericsson, R3-061505 "SFN Area Configuration for E-MBMS", 3GPP TSG-RAN WG3 Meeting #53 BIS, Oct. 10, 2006.

3GPP TS 23.246 V8.2.0; $3^{rd}$ Generation Partnership Project; Technical Specification Group Services and System Aspects; Multimedia Broadcast/Multicast Service (MBMS); Architecture and functionl description (Release 8); Jun. 2008; whole document.

3GPP Tr R3.018 V0.7.1; $3^{rd}$ Generation Partnership Project; Technical Specification Group Radio Access Network; Evolved UTRA and UTRAN; Radio Access Architecture and Interfaces (Release 7); Feb. 2007; whole document.

* cited by examiner

SIMPLE DISTRIBUTED COORDINATION AMONG CELLS TO ACHIEVE EFFICIENT DYNAMIC SINGLE-FREQUENCY NETWORK (SFN) OPERATION

RELATED APPLICATION

This application was originally filed as PCT Application No. PCT/IB2008/053985 on Oct. 1, 2008 and claims priority to U.S. Provisional Application No. 60/976,690 filed on Oct. 1, 2007, which is incorporated herein by reference in its entirety.

TECHNICAL FIELD

The present invention relates, in general, to communications systems and, more particularly, to a system and method for controlling base stations for multimedia broadcast communications.

BACKGROUND

Broadcast and multicast communications are a form of point-to-multipoint communications wherein information is simultaneously transmitted from a single source to multiple destinations. The third generation partnership project long term evolution ("3GPP LTE") is the name generally used to describe an ongoing effort across the industry to improve the universal mobile telecommunications system ("UMTS") for mobile communications to cope with continuing new requirements and the growing base of users. The goals of this broadly based project include improving communication efficiency, lowering costs, improving services, making use of new spectrum opportunities, and achieving better integration with other open standards. The term multimedia broadcast and multicast service ("MBMS") is 3GPP terminology that refers to broadcast and multicast services and related systems associated therewith.

A single frequency network ("SFN") is a transmission mode in long term evolution multimedia broadcast and multicast service wherein several transmitters simultaneously transmit the same signal over the same frequency channel. A single frequency network is also called a multicast broadcast single frequency network ("MBSFN") or multi-cell point-to-multipoint ("multi-cell PtM") mode. Thus, single frequency network operation implies content synchronization of base stations transmitting a multimedia broadcast and multicast service within an associated deployment area, for instance, within a cyclic prefix length of a few microseconds, as seen by user equipment receiving the multimedia broadcast and multicast service from the base stations. (See, e.g., 3GPP TR R3.018, entitled "3rd Generation Partnership Project; Technical Specification Group Radio Access Network; Evolved UTRA and UTRAN; Radio Access Architecture and Interfaces (Release 7)," Version 0.7.1 (February 2007), which is incorporated herein by reference.)

The UMTS terrestrial radio access network ("UTRAN") is a part of a UMTS communication network that includes one or more radio network controllers ("RNCs") and one or more nodes. An evolved UTRAN ("E-UTRAN") provides new physical layer concepts and protocol architectures for the UMTS. While the discussion that follows is directed to multimedia broadcast and multimedia multicast services for a 3GPP LTE E-UTRAN employing single frequency network transmission, the concepts as described herein are applicable to any multimedia broadcast communications and communication networks, in general.

The multimedia broadcast and multimedia multicast services often operate with a synchronized single frequency network. In the event that a service provider wishes to provide nationwide service and does not form a nationwide single frequency network, the service can instead form localized single frequency networks from multiple cells, and then form a nationwide broadcast network from the multiple localized asynchronous single frequency networks. In this arrangement, the same multimedia broadcast and multimedia multicast services are provided in every localized single frequency network. Issues arise, however, when user equipment moves between single frequency networks. The issues that arise are similar to those that currently exist in analog broadcast television, wherein users change channels or frequencies when moving across the border of two broadcast areas. This limitation is much more pronounced in multimedia broadcast and multimedia multicast services for 3GPP LTE E-UTRANs, as one single frequency network area therein is typically smaller than a conventional digital/analog broadcasting service coverage area. Additionally, issues arise in connection with controlling dynamic single frequency networks or controlling the participation of individual cells in a single frequency network based on locally varying service demand (i.e., user equipment wishing to receive the service). The problem stems from the luxury of having an uplink channel available in conjunction with the broadcast network.

Accordingly, what is needed in the art is a system and method that controls base stations for multimedia broadcast communications, especially for multimedia broadcast and multimedia multicast services for 3GPP LTE E-UTRANs employing a single frequency network.

SUMMARY

These and other problems are generally solved or circumvented, and technical advantages are generally achieved, by embodiments of the present invention, which include a system and method for controlling base stations for multimedia broadcast communications. In one embodiment, a base station includes a reporting subsystem configured to broadcast at least one of a counting report request and a channel quality indictor report request to user equipment in a service area thereof. The reporting subsystem is also configured to process at least one of a counting report and a channel quality indicator report received from the user equipment, and provide an activity status report therefrom. The base station also includes a dynamic single frequency network subsystem configured to determine to provide multimedia broadcast and multicast services in the service area thereof as a function of an activity status report from another base station.

In another aspect, the present invention provides a communication system and method of operating the same. In one embodiment, the communication system includes a base station including a reporting subsystem configured to broadcast a counting report request and a channel quality indictor report request to user equipment in a service area thereof. The reporting subsystem is also configured to process a counting report and a channel quality indicator report received from the user equipment, and provide an activity status report therefrom. The communication system also includes a network entity having a dynamic single frequency network subsystem configured to calculate a static contribution table and determine to employ the base station for multimedia broadcast and multicast services in the service area thereof as a function of the static contribution table and the activity status report.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the invention, and the advantages thereof, reference is now made to the following descriptions taken in conjunction with the accompanying drawing, in which.

DETAILED DESCRIPTION OF ILLUSTRATIVE EMBODIMENTS

Figure 1:
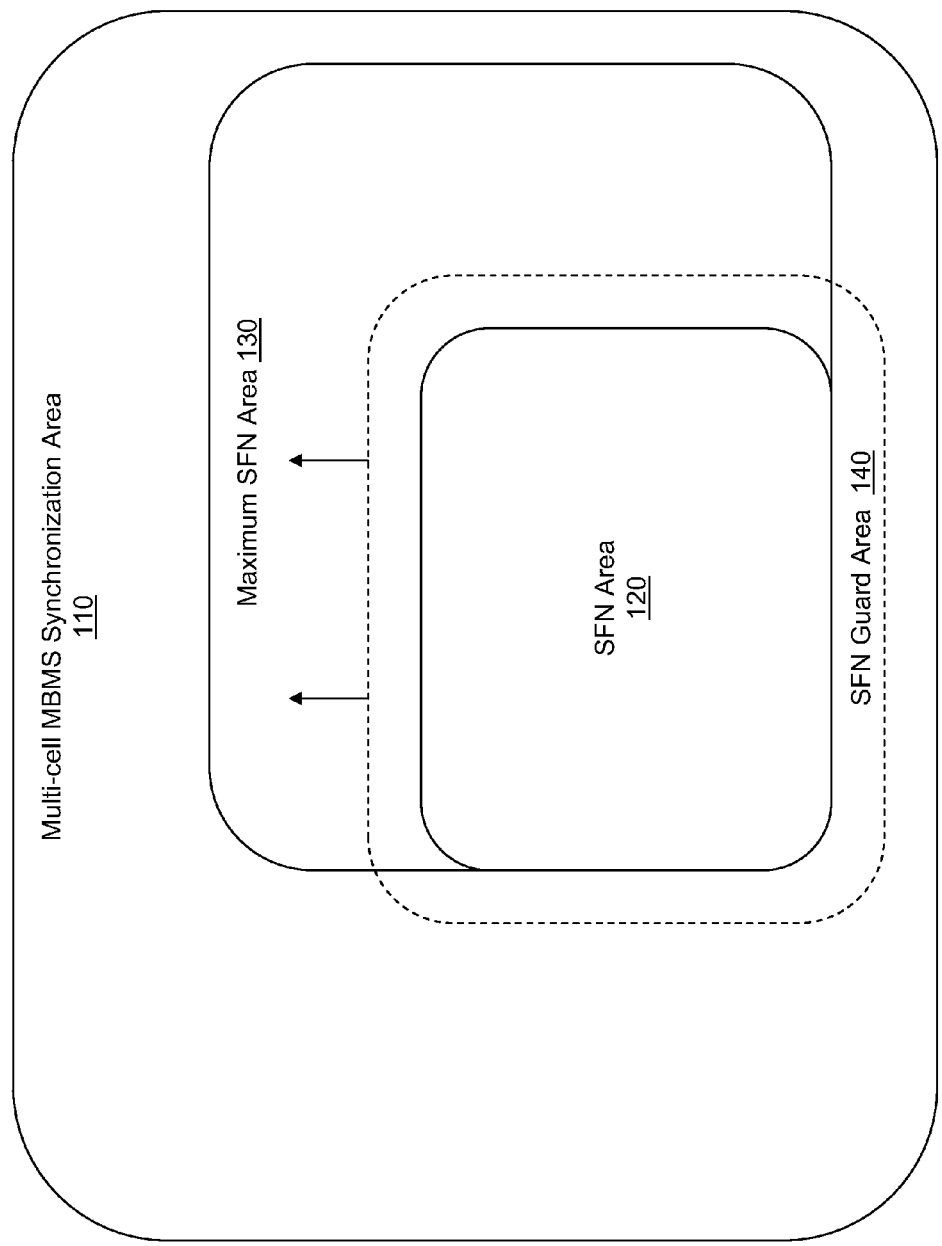
FIG. 1 illustrates a diagram demonstrating a multi-cell multimedia broadcast and multimedia multicast services synchronization area that provides an environment for application of the principles of the present invention.

The making and using of the presently presented advantageous embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention. While the concepts described herein are applicable to multimedia broadcast communications and communication networks, in general, the description that follows is directed to multimedia broadcast and multimedia multicast services for 3GPP LTE E-UTRANs employing single frequency networks. The discussion begins with more information about multimedia broadcast and multimedia multicast services, in general.

Due to increasing operator interest in mobile television and other broadcast services, the multimedia broadcast and multimedia multicast services are becoming more accepted and in same cases standardized as part of, for instance, 3GPP TS 23.246, "3rd Generation Partnership Project; Technical Specification Group Services and System Aspects; Multimedia Broadcast/Multicast Service (MBMS); Architecture and functional description (Release 8)," v. 8.2.0, June 2006, which is incorporated herein by reference. An exemplary transmission scheme for multimedia broadcast and multimedia multicast services is the single frequency network, wherein each cell is transmitting the same content in a synchronous manner. The user equipment sees the transmissions from different cells as virtual multipath components that actually provide gain in terms of received signal power and thereby improve the coverage compared to sending the content separately in each cell (e.g., unsynchronized).

On a multimedia broadcast and multimedia multicast services carrier shared with unicast operation, an uplink channel is also available. With such a carrier, it is envisioned that the uplink shall be utilized to determine with sufficient time granularity where the user equipment interested in particular multimedia broadcast and multimedia multicast services is located in the communication network (referred to as counting). Based on this information, the carrier can decide which cells should participate in the single frequency network transmission of the multimedia broadcast and multicast service and which cells may reuse the same radio resources (e.g., for unicast traffic due to lack of user equipment interest in the multimedia broadcast and multimedia multicast services). Such an optimization of the single frequency network transmission is referred to as a dynamic single frequency network.

The following possible constraints governing dynamic single frequency network operation in accordance with long term evolution multimedia broadcast and multimedia multicast services should be taken into account. The user equipment receiving the multimedia broadcast and multimedia multicast services are by default in an "idle mode," in which the default communication between the user equipment and the base stations does not keep the communication network aware of the existence of user equipment with the accuracy of the respective cells. Also, mobility of the user equipment should be assumed and within a dynamic single frequency network, this should not cause perceivable service interruption to the user equipment. Additionally, user equipment switching between the reception of different services should be assumed and this should not cause an interruption longer than, for instance, one second to the user equipment. The choice of transmission parameters (e.g., modulation, coding) of the single frequency network transmission is likely to rely on the combining gain obtained from a multi-cell transmission (i.e., typically, user equipment receiving the transmission from more than one cell enjoys sufficient coverage). In addition, decentralized control is typically a goal of most providers.

Under these exemplary constraints, an objective is then to coordinate the participation of base stations in respective cells in a single frequency network transmission of a multimedia broadcast and multicast service based on proper information received in an uplink, while aiming at efficiency in radio resource utilization, network planning and configuration, and signaling traffic, both in the radio interface and in the communication network. Mechanisms to detect the existence of user equipment in a cell, referred to as counting, include techniques based on a communication network transmitted enquiry and user equipment responding to that enquiry. In one proposed counting technique, the response from the user equipment includes transmitting a given signature sequence, and the communication system can determine if that sequence was transmitted by any user equipment without risk of the individual responses interfering. The aforementioned technique is referred to as polling. Additionally, handover in long term evolution compatible communication systems is based on the user equipment transmitting a neighbor cell measurement report whenever the received signal quality falls below a communication network assigned threshold. Based on the measurement report, the communication system makes handover decisions of user equipment between different base stations and cells. The discussion that follows provides the coordination of cells for dynamic single frequency network operation based on counting information (also referred to as "counting report") and channel quality information (also referred to as "channel quality indicator," "channel quality indicator report" or "channel quality indicator feedback") from user equipment or other network entity.

Referring initially to FIG. 1, illustrated is a diagram demonstrating a multi-cell multimedia broadcast and multimedia multicast services synchronization area 110 that provides an environment for application of the principles of the present invention. The multi-cell multimedia broadcast and multicast service ("MBMS") synchronization area 110 generally includes a group of cells having the same frequency band allocated with contiguous coverage, in which the cells may be synchronized and may transmit multimedia broadcast and multicast service data in a single frequency network transmission mode. The multi-cell MBMS synchronization areas 110 may be configured independently from multimedia broadcast and multicast service area configurations with the capability of supporting one or more single frequency network areas. For a given geographical area and a given frequency band, preferably one multi-cell MBMS synchronization area is defined (i.e., multiple multi-cell MBMS synchronization areas in the same geographical area are defined on different frequency bands).

In addition to the discussion above, a single frequency network ("SFN") area 120 includes a group of cells with contiguous coverage wherein the cells use the same radio resources in the same frequency band to synchronously transmit a single multimedia broadcast and multimedia multicast service. The SFN area 120 preferably belongs to one multi-cell MBMS synchronization area 110 and includes the actively transmitting cells at a certain point in time. Additionally, a maximum SFN area 130 supports geographical extension of an SFN area 120 and may be limited by the multi-cell MBMS synchronization area 110, multimedia broadcast and multicast service area and operator configuration. A SFN guard area 140 is a group of cells wherein the use of the same radio resources is restricted due to interference considerations as a result of resource usage in the corresponding SFN area 120. For a better understanding of the foregoing, see Section 6.19.2.1.1 of 3GPP TR R3.018, cited above.

Figure 2:
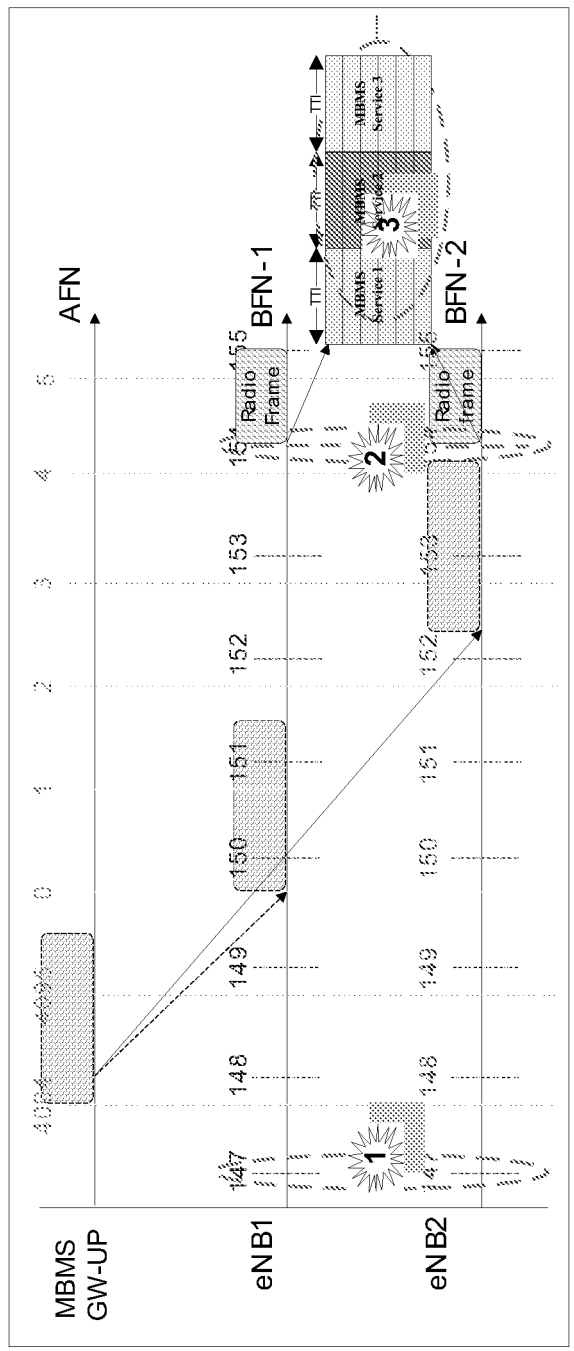
FIG. 2 illustrates a diagram demonstrating exemplary synchronization parameters associated with a single frequency network in accordance with the principles of the present invention.

Turning now to FIG. 2, illustrated is a diagram demonstrating exemplary synchronization parameters associated with a single frequency network in accordance with the principles of the present invention. The communication system elements illustrated in FIG. 2 include a multimedia broadcast and multicast service gateway user plane (designated "MBMS GW-UP"), and first and second base stations (designated "eNB1" and "eNB2," respectively). At the physical layer, frame timing (e.g., at the microsecond level) of each base station in an SFN area is preferably aligned at a start boundary of each frame to ensure the physical layer framing time synchronization. Regarding content level transmission, the same content of a multimedia broadcast and multicast service should be transmitted at the same time by each base station in an SFN area to ensure that the same content can be combined in time at the user equipment.

Regarding resource block allocation, the physical resource block allocation pattern in each transmission time interval should be coincident for all base stations in an SFN area to ensure that the same resource block is used for the same multimedia broadcast and multicast service data from the different base stations. For a better understanding of the foregoing, see Section 6.19.2.1.2 of 3GPP TR R3.018, cited above. For purposes of the illustration, BFN refers to the base station frame number counter as the communication network synchronization reference, which is typically in a range from 0 to 4095. Also, AFN refers to the MBMS GW-UP frame number counter as the communication network synchronization reference, which is typically in a range from 0 to 4095.

Studying the possibility of dynamically adjusting the size of an SFN area (referred to as "dynamic SFN") may be advantageous. One possibility is to make SFN areas dynamically based on user equipment movement. Some expected benefits from dynamic SFN include more capacity for unicast communications, reuse of radio resources between multiple multimedia broadcast and multimedia multicast services, and easier interference conditions on the SFN area borders (i.e., improvement in performance and multimedia broadcast and multicast service continuity at the edge of the cells).

Figure 3:
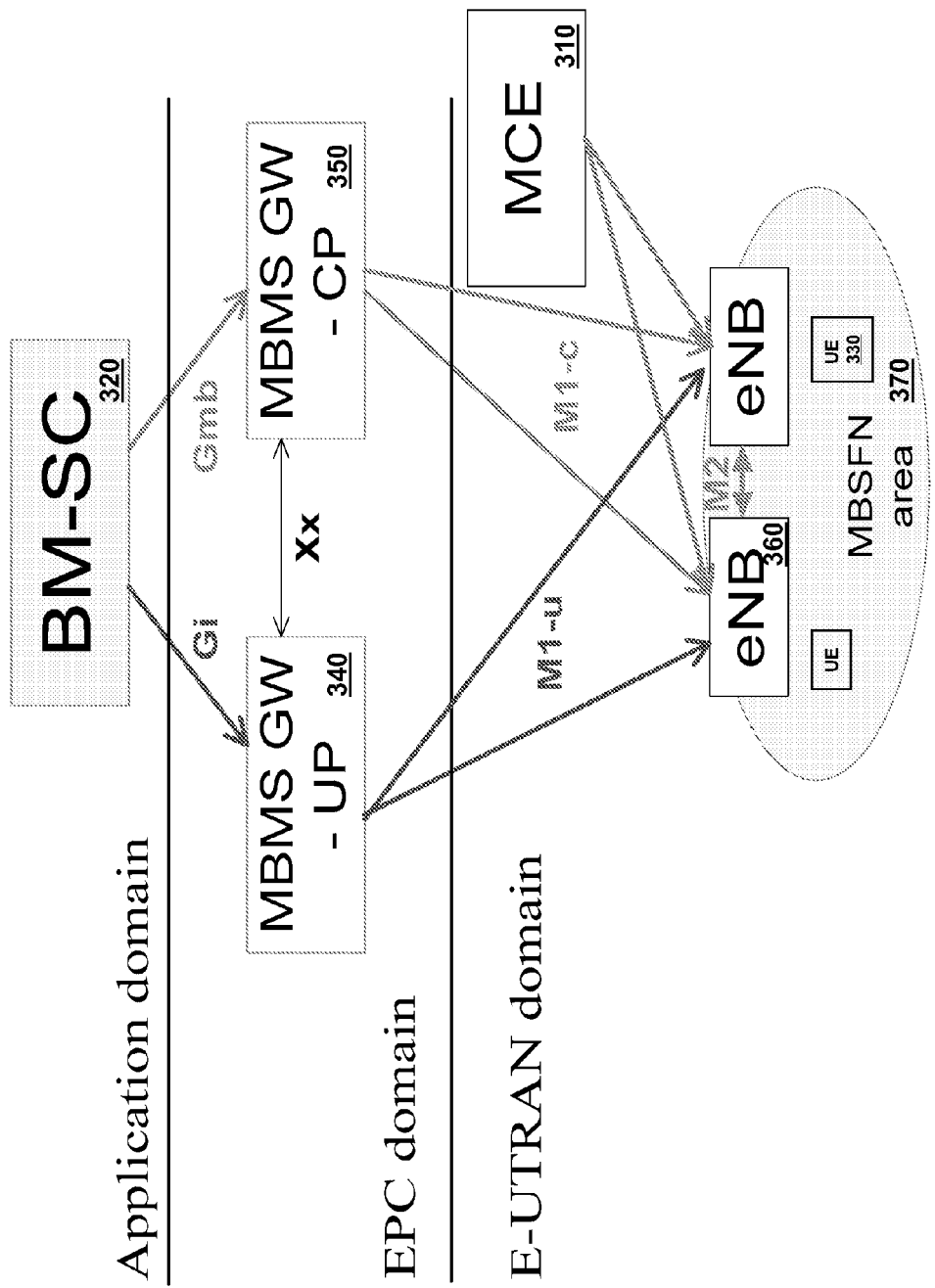
FIGS. 3 and 4 illustrate system level diagrams of embodiments of communication systems employable with communication networks that provide an environment for application of the principles of the present invention.
Figure 4:
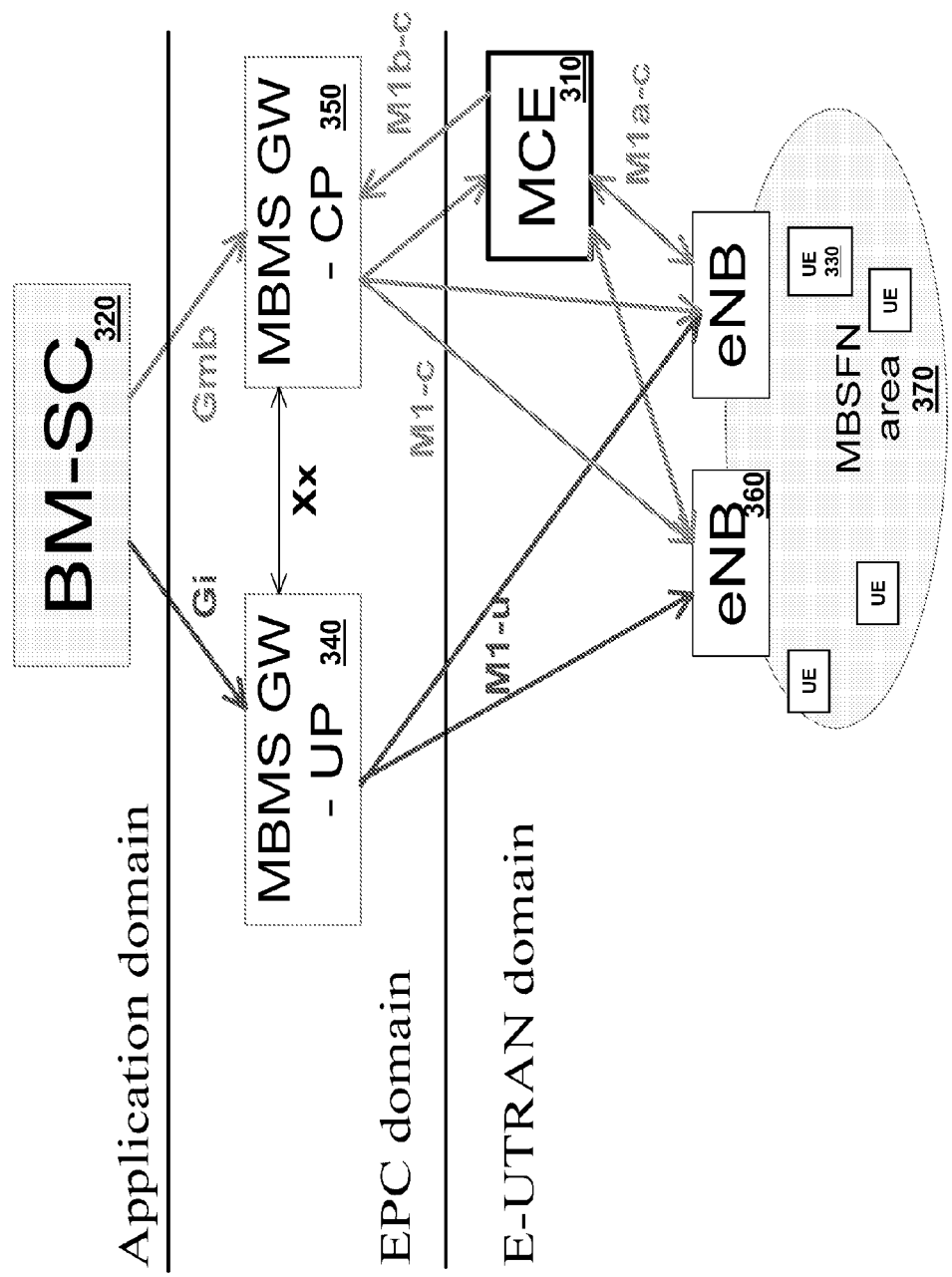

Turning now FIGS. 3 and 4, illustrated are system level diagrams of embodiments of communication systems employable with communication networks that provide an environment for application of the principles of the present invention. The communication networks include 3GPP LTE E-UTRANs employing single frequency network transmission. The communication systems of FIGS. 3 and 4 demonstrate light and general deployment, respectively. A property of the light deployment is that a functionality of a multi-cell multimedia broadcast and multicast service coordination entity ("MCE") 310 is semi-statically or statically configured in the relevant nodes.

The communication systems include an application domain with a broadcast/multicast service center ("BM-SC") 320. The BM-SC 320 serves as an entry point for content delivery services within the communication networks. The BM-SC 320 configures and controls transport bearers for the multimedia broadcast and multimedia multicast services to a mobile core network (e.g., an evolved packet core domain and E-UTRAN domain) and schedules and delivers transmissions for the multimedia broadcast and multimedia multicast services. The BM-SC 320 also provides service announcements for user equipment ("UE," one of which is designated 330) to join multimedia broadcast and multimedia multicast services such as, without limitation, a multicast service identifier, internet protocol multicast addresses, time of transmission and media descriptions. The BM-SC 320 can also be used to generate charging records for information transmitted by a content provider and manage security functions specified by 3GPP for a multicast mode.

The communication systems also include an evolved packet core ("EPC") domain with multimedia broadcast and multicast service gateways ("MBMS GWs"). The EPC domain includes a multimedia broadcast and multicast service gateway user plane ("MBMS GW-UP") 340 and a multimedia broadcast and multicast service gateway control plane ("MBMS GW-CP") 350. During session initiation, the MBMS GW-UP 340 assigns a private Internet protocol ("IP") multicast address used for a user data stream distribution towards base stations ("eNB," one of which is designated 360). The MBMS GW-UP 340 is responsible for forwarding from the BM-SC 320 received IP packets to the base stations 360 that have joined the private IP multicast group of a particular MBMS stream. In the case of a single frequency network transmission mode, the MBMS GW-UP 340 adds to the forwarded data unit's information based on which of the base stations 360 are able to have an air interface transmission synchronization. The interface between MBMS GW-UP 340 and the base stations 360 is called M1-u. The MBMS GW-CP 350 is a functional entity that takes care of the MBMS session management in the evolved packet core, which is terminated by a Gmb interface. The MBMS GW-CP 350 delivers the MBMS session start/stop messages to the base stations 360 part of the targeted multimedia broadcast and multicast service area. The interface between the MBMS GW-CP 350 and base stations 360 is called M1-c.

The main tasks for the MCE 310 (also referred to as an MBMS radio resource management entity or operations and maintenance server) are to perform radio resource management and define rules for data scheduling for the single frequency network transmission mode among the cells part of the same SFN area. In addition, the MCE 310 may be involved in the handling of counting results (e.g., in a shared carrier case). The major property of the light multimedia broadcast and multicast service deployment is that the MCE 310 functionality is semi-statically or statically configured in the relevant nodes.

The communication systems also include an E-UTRAN domain with the base stations 360 defining a multimedia broadcast single frequency network ("MBSFN") area 370 for the user equipment 330 therein. The base station 360 is responsible for the air interface operation. The base station 360 controls the mapping of MBMS service areas to cells. In the single frequency network transmission mode, the base stations 360 that are part of the same SFN area should be synchronized. The pre-defined parameters are used when producing a transport block ("TB") as well as for the radio resource management and scheduling to ensure unified output in the base stations 360 of the SFN area. The termination for radio resource controller for single frequency network transmission mode will depend on the multimedia broadcast and multicast service control channel ("MCCH") concept and on the content of the radio resource control messages. The radio resource management in a single frequency network transmission mode employs coordination between the cells, which are part of the SFN area. Counting is done on a cell basis and, therefore, considered as a task of the base station 360.

Figure 5:
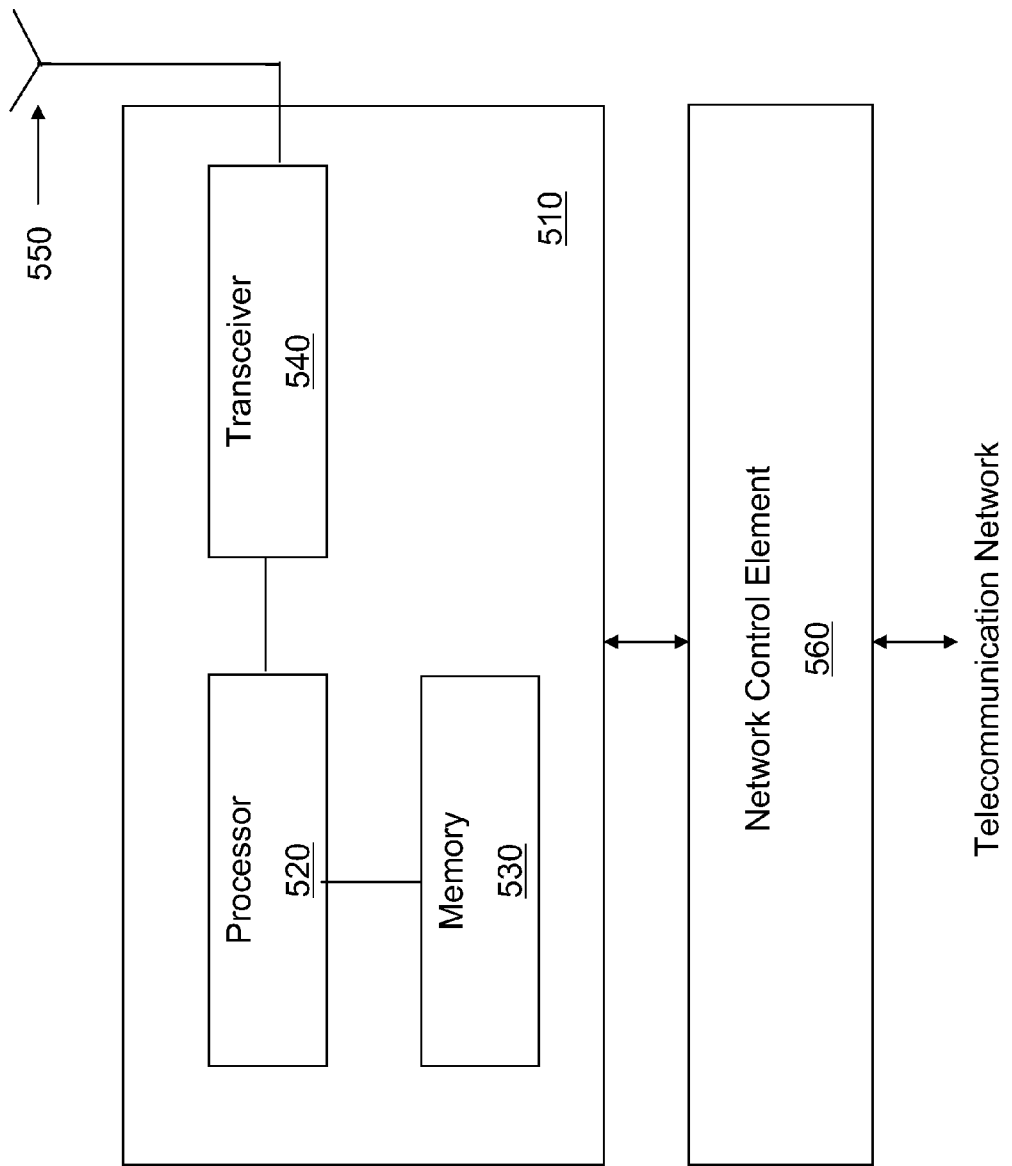
FIG. 5 illustrates a system level diagram of an embodiment of a communication element of a communication system that provides an environment for application of the principles of the present invention.

Turning now to FIG. 5, illustrated is a system level diagram of an embodiment of a communication element 510 of a communication system that provides an environment for application of the principles of the present invention. The communication element 510 may represent any network entity such as, without limitation, a base station, user equipment (e.g., a mobile station), or a network control element. The communication element 510 includes a processor 520, memory 530 that stores programs and data of a temporary or more permanent nature, an antenna 550, and a radio frequency transceiver 540 coupled to the antenna 550 and the processor 520 for bidirectional wireless communications. The communication element 510 may provide point-to-point and/or point-to-multipoint communication services.

The communication element 510 such as a base station in a cellular communication network may be coupled to a communication network element such as a network control element 560 of a public switched telecommunication network. The network control element 560 may, in turn, be formed with a processor, memory, and other electronic elements. The network control element 560 preferably provides access to a telecommunication network such as a public switched telecommunication network. The access may be provided by a fiber optic, coaxial, twisted pair, or microwave communication link coupled to an appropriate link terminating element. A communication element 510 formed as a mobile station is generally a self-contained device intended to be carried by an end user.

The processor 520 in the communication element 510, which may be implemented with a plurality of processing devices, performs functions associated with its operation including, without limitation, encoding and decoding of individual bits forming a communication message, formatting of information, and overall control of the communication element 510, including processes related to management of resources. Exemplary functions related to management of resources include, without limitation, hardware installation, traffic management, performance data analysis, tracing of end users and equipment, configuration management, and end user administration, management of mobile equipment, and management of tariffs, charging, and billing. The execution of all or portions of particular functions or processes related to management of resources may be performed in equipment separate from and coupled to the communication element 510, with the results of such functions or processes communicated for execution to the communication element 510. The processor 520 of the communication element 510 may be of any type suitable to the local application environment, and may include one or more of general purpose computers, special purpose computers, microprocessors, digital signal processors ("DSPs"), and processors based on a multi-core processor architecture, as non-limiting examples.

The transceiver 540 of the communication element 510 modulates information onto a carrier waveform for transmission by the communication element 510 via the antenna 550 to another communication element. The transceiver 540 demodulates information received via the antenna 550 for further processing by other communication elements.

The memory 530 of the communication element 510 as introduced above may be of any type suitable to the local application environment, and may be implemented using any suitable volatile or nonvolatile data storage technology such as a semiconductor-based memory device, a magnetic memory device and system, an optical memory device and system, fixed memory, and removable memory. The programs stored in the memory 530 may include program instructions that, when executed by an associated processor, enable the communication element 510 to perform tasks as described herein. Exemplary embodiments of the system, subsystems and modules as described herein may be implemented, at least in part, by computer software executable by processors of, for instance, the user equipment and the base station, or by hardware, or by combinations thereof. As will become more apparent, systems, subsystems and modules may be embodied in the communication element 510 as illustrated and described above.

Figure 6:
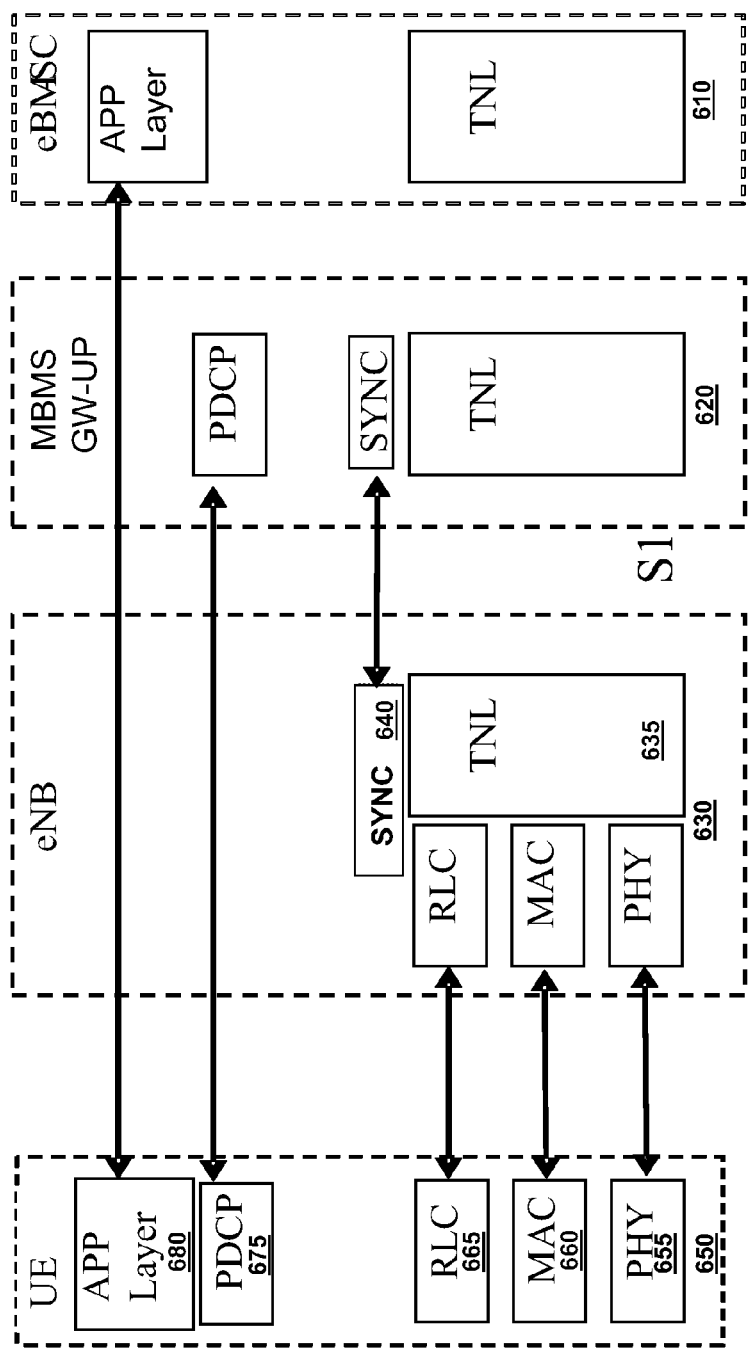
FIGS. 6 and 7 illustrate block diagrams of embodiments of communication systems constructed in accordance with the principles of the present invention.
Figure 7:
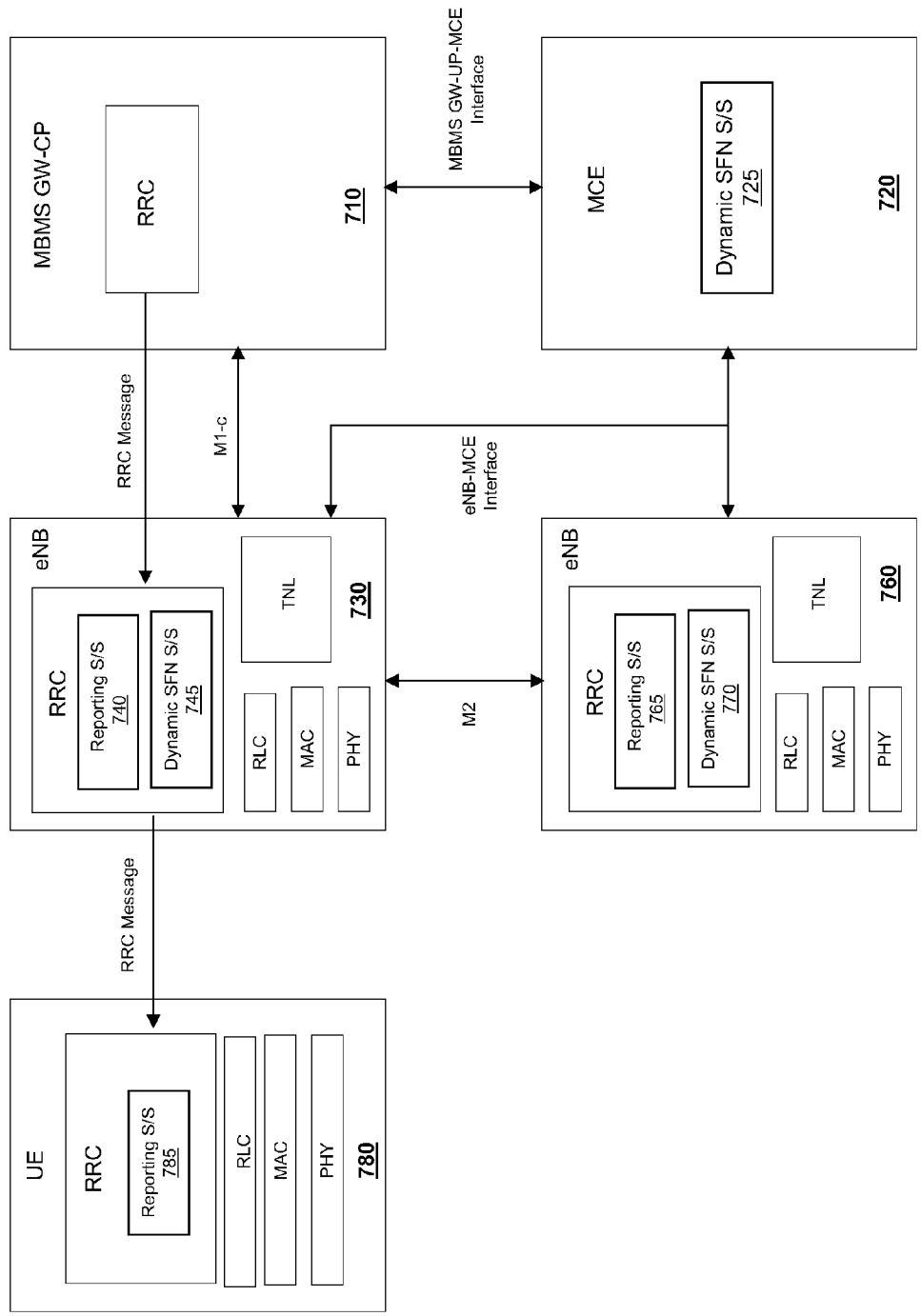

Turning now to FIGS. 6 and 7, illustrated are block diagrams of embodiments of communication systems constructed in accordance with the principles of the present invention. Beginning with FIG. 6, illustrated is a user plane architecture of the systems architecture evolution bearer level content synchronization in supporting multimedia broadcast and multicast service single frequency network operation including a broadcast/multicast service center (designated "eBM-SC") 610, a multimedia broadcast and multicast service gateway user plane (designated "MBMS GW-UP") 620, a base station (designated "eNB") 630 and user equipment (designated "UE") 650. The architecture is based on the functional allocation for unicast communications and includes a synchronization subsystem between a transport network layer and a packet data convergence protocol layer to support a level two content synchronization mechanism.

The user equipment 650 includes a physical resource subsystem (designated "PHY") 655, a media access control protocol subsystem (designated "MAC") 660, a radio link control protocol subsystem (designated "RLC") 665, a packet data convergence protocol subsystem (designated "PDCP") 675, and an application layer subsystem (designated "APP Layer") 680.

The physical layer subsystem 655 defines the electrical and the physical specifications for the interfaces for the user equipment 650. The media access control protocol subsystem 660 provides addressing and channel access control mechanisms for the user equipment 650. For instance, the media access control protocol subsystem 660 maps the multimedia broadcast and multicast service control channel ("MCCH") and the multimedia broadcast and multicast service transport channel ("MTCH") on a multicast channel ("MCH") or a shared channel ("SCH"), depending on deployment scenarios, and schedules the transmission of MCCH and MTCH with proper timing and transport format. The radio link control protocol subsystem 665 provides error correction, retransmission, segmentation and reassembly of multimedia broadcast and multicast service data for the user equipment 650. For instance, assuming a radio link control unacknowledgement mode, the radio link control protocol subsystem 665 provides concatenation/segmentation under control of a centralized functionality.

The packet data convergence protocol subsystem 675 performs IP header compression and decompression, transfers multimedia broadcast and multicast service data, and maintains sequence numbers for radio bearers. In addition to the corresponding layers of the user equipment 650, the base station 630 includes a transport network layer subsystem (designated "TNL") 635. A synchronization subsystem (designated "SYNC") 640 of the base station 630 synchronizes the transmission of multimedia broadcast and multicast service data through the base station 630. The synchronization subsystem 640 provides timing indication of radio transmissions for multimedia broadcast and multicast service packets (e.g., PDCP frames), maintains synchronization, and detects data losses in number of bytes as well as in number of packets. The multimedia broadcast and multicast service gateway 620 and the broadcast/multicast service center 610 include many of the subsystems corresponding to the subsystems of the base station 630 and user equipment 650 as described above.

Turning now to FIG. 7, illustrated is a control plane architecture of the systems architecture in supporting multimedia broadcast and multicast service single frequency network operation including network entities such as a multimedia broadcast and multicast service gateway control plane (designated "MBMS GW-CP") 710, a multi-cell multimedia broadcast and multicast service coordination entity ("MCE") 720, first and second base stations (designated "eNB") 730, 760 and user equipment (designated "UE") 780. The control plane architecture radio interface stacks for multimedia broadcast and multicast service are similar to a long term evolution unicast communication architecture. A radio resource controller ("RRC") and the multimedia broadcast and multicast service control channel ("MCCH") are terminated in the first and second base stations 730, 760. The MCE 720 is employed to control the single frequency network operation. The MCE 720 can be responsible for providing the contents of single frequency network control signaling sent on single frequency network transmitted MCCH(s) and controlling the transmission of such MCCH(s) as well as the single frequency network operation.

The radio resource controller provides, without limitation, multimedia broadcast and multicast service context handling (including bookkeeping), multimedia broadcast and multicast service radio bearer handling and control, MCCH transmission control at the first and second base stations 730, 760, MCCH acquisition and reception of multimedia broadcast and multicast service control information, notification, radio bearer reconfiguration at the user equipment 780, and point-to-point procedures facilitating multimedia broadcast and multicast service operations, when needed. Again, the control plane architecture supports long term evolution multimedia broadcast and multimedia multicast service. A reporting subsystem (designated "Reporting S/S") 785 in the user equipment 780 is responsible for providing a counting report and channel quality indicator report to the first and second base stations 730, 760 after receiving a counting report request or channel quality indicator report request. A reporting subsystem 740 in the first base station 730 is responsible for broadcasting the counting report request and channel quality indictor report request to the user equipment 780 in its service area. In addition, the reporting subsystem 740 is also responsible for processing the counting report and channel quality indicator report received from the user equipment 780, and summarizing the same via an activity status report.

For the purposes of the discussion herein, the terms nearby base station, neighboring base station, and base station in scope have an analogous same meaning with respect to a subject base station. Typically, the aforementioned base stations are base stations in the subject base station's critical or gray zone as will become more apparent below. Additionally, the terms nearest base station and serving base station have an analogous meaning. In a mixed carrier multimedia broadcast and multicast service wherein both multimedia broadcast and multicast service and unicast service is provided, the serving base station is the base station from which the user equipment receives both unicast and multimedia broadcast and multimedia multicast service. In a dedicated carrier multimedia broadcast and multimedia multicast service, the serving base station is defined as the base station providing the strongest signal to the user equipment for the multimedia broadcast and multimedia multicast service.

In a distributed architecture, the reporting subsystem 740 in the first base station 730 is responsible for sending or providing the activity status report to a dynamic single frequency network subsystem (designated "dynamic SFN S/S") 765 in a list of neighboring base stations such as the second base station 760. In a centralized architecture, the reporting subsystem 740 in the first base station 730 is responsible for sending or providing the activity status report to the dynamic single frequency network subsystem 725 in the MCE 720. The dynamic single frequency network subsystem 725 in the MCE 720 is responsible for calculating a static contribution table as set forth herein.

In addition to calculating a static contribution table, in a centralized architecture, the dynamic single frequency network subsystem 725 in the MCE 720 is responsible for receiving the activity status report from the first and second base stations 730, 760, and deciding whether to turn on/off or reuse the first and second base stations 730, 760 based on the static contribution table and received activity status reports. After a decision is made, the dynamic single frequency network subsystem 725 in the MCE 720 sends commands to the dynamic single frequency network subsystems 745, 770 of the first and second base stations 730, 760, respectively, to control a behavior thereof. In addition to calculating a static contribution table, in the distributed architecture, the dynamic single frequency network subsystem 725 in the MCE 720 decides for each base station a list of base stations whose critical zone or gray zone covers the first and second base stations 730, 760 based on the static contribution table and informs the base stations of the respective lists of base stations.

In the centralized architecture, the dynamic single frequency network subsystem 745 in the first base station 730 is responsible for turn on/off or reuse for the first base station 730 for other traffic based on the command from the MCE 720. In the distributed architecture, the dynamic single frequency network subsystem 745 in the first base station 730 receives the activity status report from neighboring base stations. In addition, the dynamic single frequency network subsystem 745 uses received activity status reports and the static contribution table to decide whether to turn on/off or reuse the resource in the first base station 730 for other traffic. Of course, analogous principles apply for the second base station 760. Thus, an M2 interface as illustrated in FIG. 7 is principally used in accordance with the distributed architecture.

Regarding communication system performance, the distribution of user equipment 780 in a multimedia broadcast single frequency network area is not evenly distributed and, in some cases, certain base stations (such as the first and second base stations 730, 760) may not have any user equipment 780 receiving multimedia broadcast and multicast service at all. In the latter case, it may be advantageous to cease the multimedia broadcast and multicast service transmissions from the idle first base station 730 to reduce the overall communication system power consumption. Furthermore, the unused multimedia broadcast and multicast service spectrum associated with the idle first base station 730 may be allocated for other resources such as unicast communications, thereby improving the spectrum efficiency of the communication system. A unicast communication is a form of point-to-point communication wherein information is transmitted from a single source to a single destination. When turning off a base station (such as the first base station 730) that is not providing multimedia broadcast and multicast service to the user equipment 780, it is preferable to ensure the receiving quality of the user equipment 780 in other cells of the multimedia broadcast single frequency network area. Again, the second base station 760, which also includes a reporting subsystem 765 and the dynamic single frequency network subsystem 770, operates in an analogous manner to the first base station 730.

Figure 8:
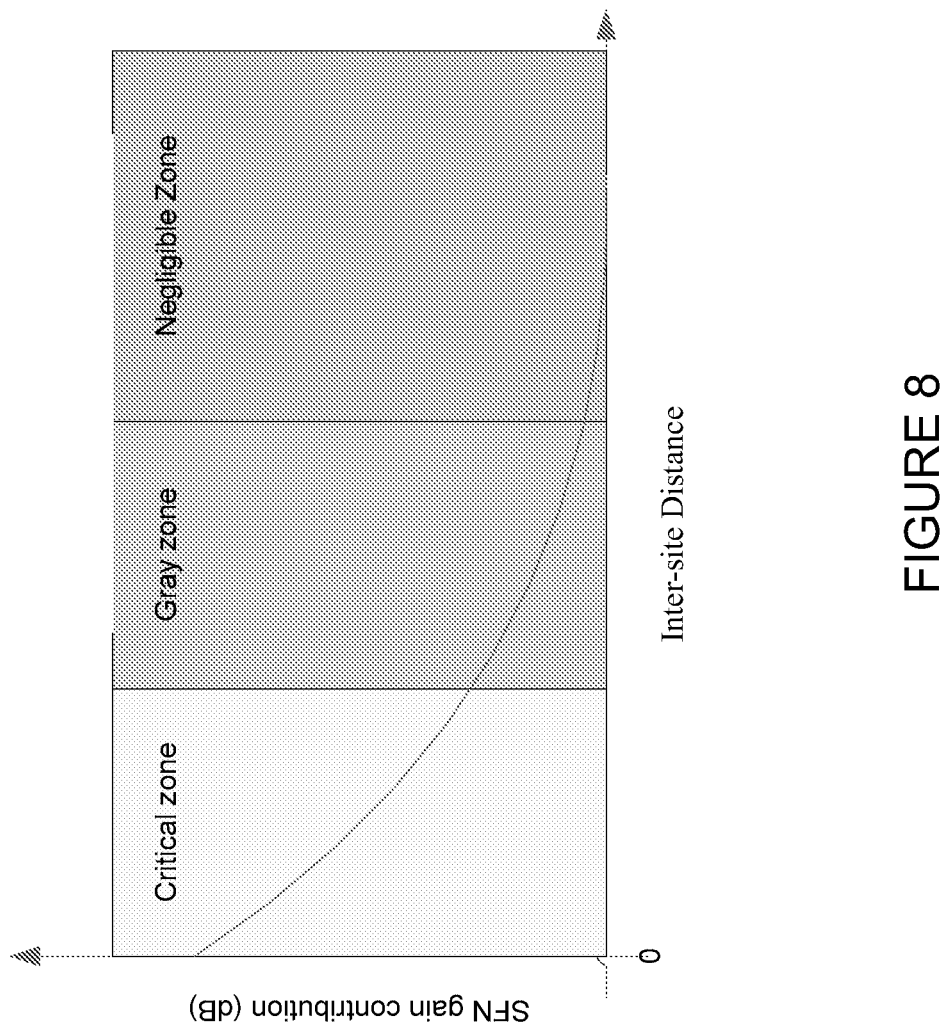
FIG. 8 illustrates a graphical representation of an embodiment of a static contribution table constructed according to the principles of the present invention.

Turning now to FIG. 8, illustrated is a graphical representation of an embodiment of a static contribution table constructed according to the principles of the present invention. In one embodiment, the communication system as described herein estimates a subject base station's contribution to single frequency network combining gain (in decibels ("dB")) of the user equipment based on a distance from the subject base station to the user equipment's serving base station. In a more general term, the geographical relation between the base station and the user equipment's serving base station are used to estimate the contribution to single frequency network combining gain of the user equipment. The geographical relation includes, without limitation, the distance between two base stations, the distance from one base station to the far end or near end of the coverage of another base station (e.g., at most plus/minus ½ inter-site distance compared with the distance between two base stations), building, street layout, etc.

From the estimated single frequency network combining gain contribution, the communication system segments the subject base stations in the whole communication network into three zones based on its geographical relation with the user equipment's serving base station denoted in the graphical representation of the static contribution table. The first zone is referred to as a critical zone, wherein the single frequency network combining gain contribution from subject base station to the user equipment is important. The second zone is referred to as a negligible zone, wherein the single frequency network combining gain contribution from the subject base station to the user equipment is marginal. The third zone is referred to as a gray zone, wherein the importance of the single frequency network combining gain contribution depends on, for instance, the receiving channel quality of the user equipment. Since the estimation is typically done based on geographical relation between base stations, the static contribution table can be created before the multimedia broadcast and multicast services start.

In an exemplary implementation employing a distributed approach, all base stations in a nearby area (also referred to as "nearby base stations," which may be a "neighboring base station") inform a subject base station of an operational status regarding a multimedia broadcast and multicast service thereof (e.g., on/off), counting information (e.g., is there any user equipment in multimedia broadcast and multicast service within the service area of the nearby serving base stations), and a channel quality indicator of the user equipment with the lowest channel quality in the service area of the nearby serving base stations. The counting information is used by the subject base station or MCE to decide whether a multimedia broadcast and multicast service session is being transmitted in certain cells in a multimedia broadcast single frequency network transmission mode. In a single cell transmission case, the counting information is used to determine whether a multimedia broadcast and multicast service session is transmitted via point-to-point or point-to-multipoint. The counting information is also used to determine if a single cell transmission or multimedia broadcast single frequency network transmission mode is used for the multimedia broadcast and multicast service session. A counting procedure determines the number of user equipment interested in the given multimedia broadcast and multicast service in a cell, or to determine whether there are any interested user equipment in a given cell. While the communication system is not so limited, the counting procedure may include a counting request from the subject base station or the MCE, and a counting response from the user equipment to the subject base station or the MCE.

Based on the static contribution table and the user equipments' activity status report (e.g., including counting information and channel quality indicator report) received from nearby base stations, the communication system employs the following methodology. If there is at least one user equipment receiving multimedia broadcast and multicast service in the subject base station's critical zone, the subject base station should remain on. If all user equipment receiving multimedia broadcast and multicast service is within the subject base station's negligible zone, the base station can be turned off. If no user equipment is in the critical zone, but at least one user equipment receiving multimedia broadcast and multicast service is in the subject base station's gray zone, the communication system decides whether to turn off the subject base station based on user equipment channel quality indicator feedback, if available. If the channel quality indicator feedback is not available, the subject base station should remain on. Thus, the gray zone is treated analogous to the critical zone of the channel quality indicator feedback is not available.

For any base station, the communication system can either calculate its average signal strength in each cell based on, without limitation, inter-site/base station distance ("ISD"), transmission power, antenna pattern, and channel information, or measure and update the information in real time. Thus, the communication system can obtain a table that includes average added signal-to-interference and noise ratio ("SINR") in every cell of each base station's transmission. In the case where the base stations transmit at equal power and all base stations are in a line of sight ("LOS"), the average added signal-to-interference and noise ratio of a base station's transmission mostly depends on the distance between the base station and the cell. Thus, the static contribution table can be pre-calculated and stored for use. It should be noted that the serving base station in the graphical representation of FIG. 8 typically falls within the critical zone associated with the static contribution table.

Figure 9:
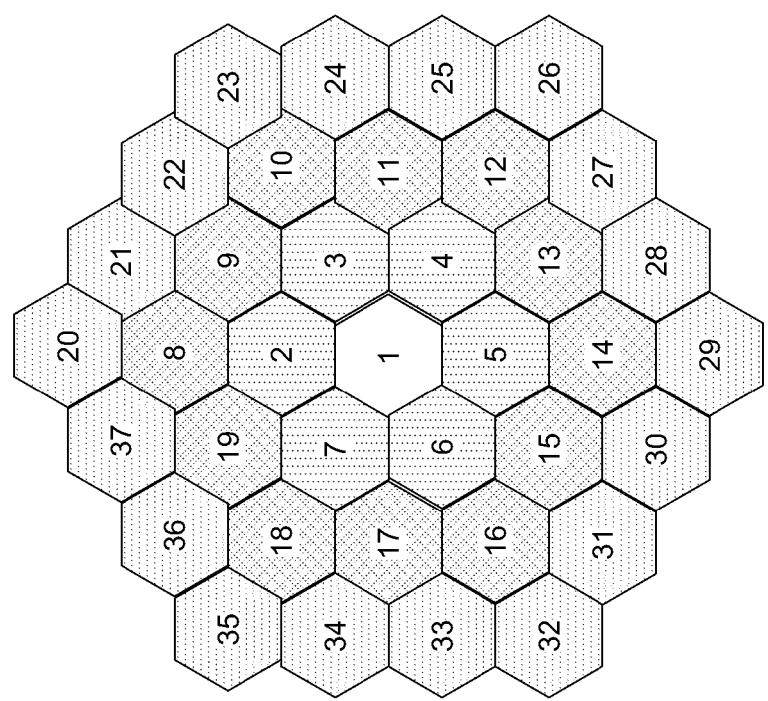
FIG. 9 illustrates a diagram representing an embodiment of a static contribution table constructed according to the principles of the present invention.

Turning now to FIG. 9, illustrated is a diagram representing an embodiment of a static contribution table constructed according to the principles of the present invention. In one embodiment, if equal inter-site/base station distance and same transmission power is applied in the communication network, the contribution table can be counted by the number of rings between two base stations. For example, FIG. 9 illustrates a multimedia broadcast single frequency network area with four rings of multimedia broadcast and multicast service cells. Assuming that the user equipment in cell 1 (ring 0) receives multimedia broadcast and multicast service signals from all of the base stations, the communication system can obtain the added signal-to-interference and noise ratio per base station transmission shown in TABLE I.

TABLE I

| Ring 0 | UE's own cell (reference) |
|---|---|
| One eNB in Ring 1, wherein Ring 1 includes Cells 2 to 7 | 1 dB |
| One eNB in Ring 2, wherein Ring 2 includes Cells 8 to 19 | 0.3 dB |
| One eNB in Ring 3, wherein Ring 3 includes Cells 20 to 37 | 0.1 dB |
| eNBs in Ring >3 | negligible |

Note that the values in TABLE I are for illustration only. The actual values for a given multimedia broadcast single frequency network depend on, for instance, the transmission power of the base stations, the inter-site/base station distance, the antenna pattern, and the channel status. TABLE I can be pre-calculated or measured in real time.

Regarding uplink feedback, user equipment in service should report its existence via a counting report to, for instance, its serving base station. The channel quality indicator feedback from the user equipment to the serving base station may also be employed. Thus, an activity status report of this cell includes a counting information of this cell and a channel quality indicator report, which should be provided to those base stations whose critical zone or gray zone covers the base station in distributed architecture, and which should be provided to MCE in centralized architecture.

The activity status report typically includes a base station's operational status regarding a multimedia broadcast and multicast service (e.g., on/off), the base station's counting information (i.e., is there any user equipment in service within the service area of this base station) and the channel quality indicator feedback of the user equipment with the lowest channel quality. TABLE II shows one example of information in the activity status report sent between base stations.

TABLE II

| Information Element | Type | Example | Explanation |
|---|---|---|---|
| eNB id | INTEGER | 1, 2, 3 | eNB identity ("id") |
| eNB operation status | BOOLEAN | True/false | True: this eNB is transmitting MBMS signal. False: this eNB is NOT transmitting MBMS signal. |
| eNB counting result | BOOLEAN | True/false | True: at least one UE is receiving this MBMS from this eNB. False: no UE is receiving this MBMS from this eNB |
| CQI | DOUBLE | 18, 12, NA | Double value represent receiving power in dB scale NA: CQI feedback not available |

Figure 10:
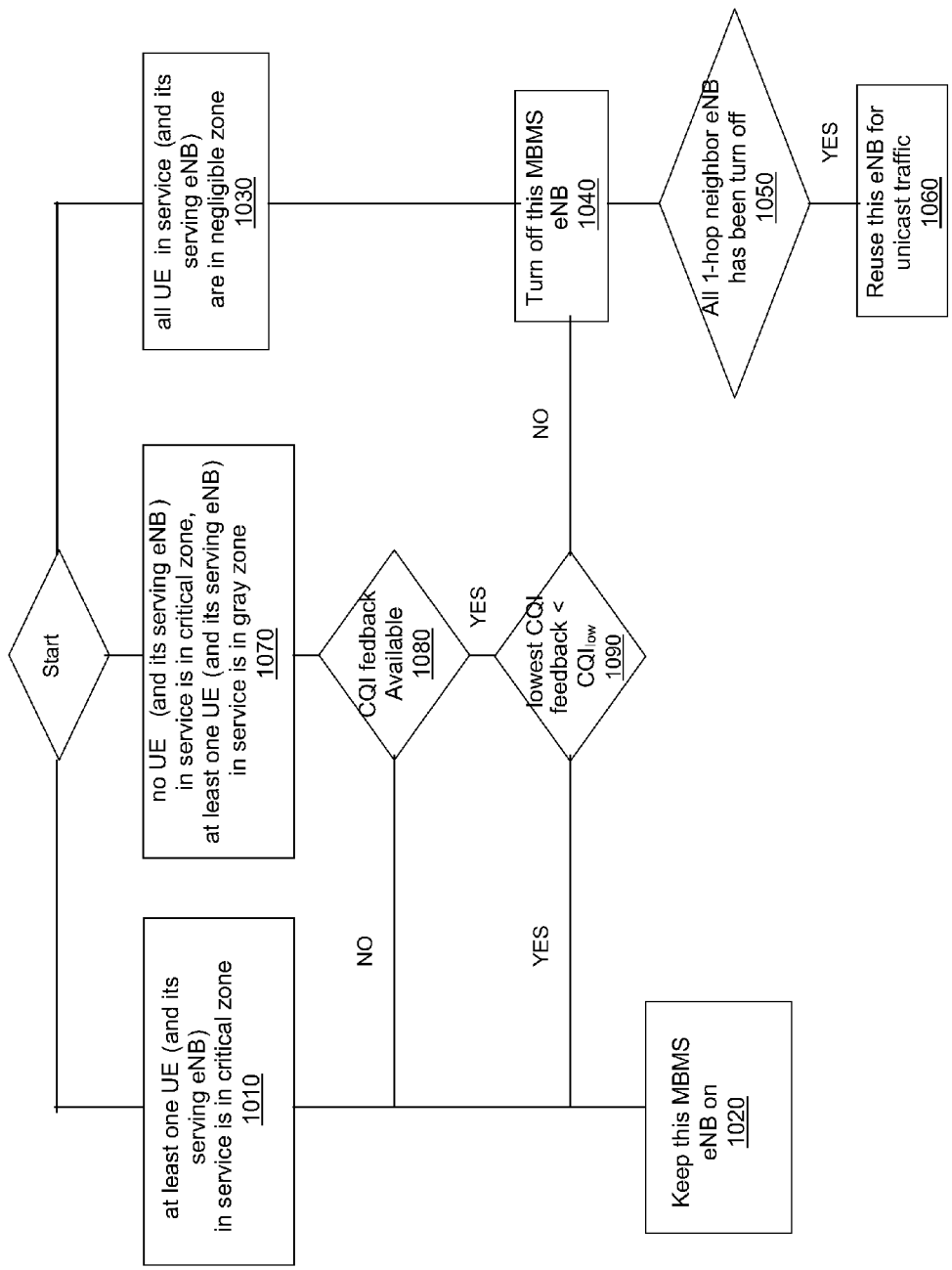
FIG. 10 illustrates a flow diagram of an embodiment of a method of operating a communication system constructed according to the principles of the present invention.

Turning now to FIG. 10, illustrated is a flow diagram of an embodiment of a method of operating a communication system constructed according to the principles of the present invention. In order to ensure multimedia broadcast and multicast service quality, generally a lower bound of received signal-to-interference and noise ratio ("$SINR_{low}$") and channel quality indicator ("$CQI_{low}$") is assumed. The method to determine to turn on/off the transmission of a multimedia broadcast and multicast service in base stations, and reuse this resource for other purpose, is presented below.

At a step 1010, if there is at least one user equipment receiving multimedia broadcast and multicast service in the subject base station's critical zone, the subject base station should be kept on during a step 1020. At a step 1030, if all user equipment receiving multimedia broadcast and multicast service are within the subject base station's negligible zone, the subject base station can be turned off during a step 1040. Additionally, at a decisional step 1050, if all nearby base stations are in an off-state regarding the multimedia broadcast and multimedia multicast service, the subject base station may use or request to use its multimedia broadcast and multicast service resources for other resources such as unicast communications during a step 1060, if needed.

At a step 1070, if no user equipment is in the critical zone, but at least one user equipment is in the gray zone, the communication system decides whether to turn off the subject base station based on the user equipment's channel quality indicator feedback, if available. At a decisional step 1080, if the channel quality indicator feedback is not available, the subject base station should remain on (see, step 1020). At a decisional step 1090, if the channel quality indicator feedback representing the lowest channel quality is greater than (i.e., better than) the lower bound channel quality indictor $CQI_{low}$, then the subject base station should be turned off (see, step 1040). At the decisional step 1090, if the channel quality indicator feedback representing the lowest channel quality is less than the lower bound channel quality indictor $CQI_{low}$, then the subject base station should be turned on (see, step 1020).

By way of example, the communication system will employ the information provided in the activity status report of TABLE II and the base station's contribution to single frequency network combining gain as provided in TABLE I. Suppose the predefined lower bound for the signal-to-interference and noise ratio $SINR_{low}$ is 13 dB, and a third base station is a neighbor of a second base station. Assuming that turning on one neighboring base station will increase the signal-to-interference and noise ratio by one dB as shown in TABLE I, then the multimedia broadcast and multicast service transmission of the third base station will be turned on. On the other hand, if the signal-to-interference and noise ratio of all neighboring cells of the cell of a fourth base station is more than 14 dB, the fourth base station can be turned off because after turning off the fourth base station, the lowest signal-to-interference and noise ratios in all neighboring cells will be still above 13 dB.

The communication system as described herein can also determine a lower bound channel quality indictor $CQI_{low}$ from, for instance, user equipment minimum signal-to-interference and noise ratio target $SINR_{target}$ and static contribution table as set forth below:

$$CQI_{low}(X) = SINR_{target} + N(X) * \text{contribution}(X),$$

wherein X is the distance in number of rings from the subject base station to the base station in the gray zone, $N(X)$ is the number of base stations in ring X whose gray zone covers the base station, and contribution (X) is single frequency network combining gain of one base station in ring X. The lower bound channel quality indictor $CQI_{low}$ is derived from the user equipment's minimum signal-to-interference and noise ratio target $SINR_{target}$ plus a certain margin. The margin is the total single frequency network combining gain from all base stations whose gray zone covers this base station.

With continuing reference to FIG. 9, assume that the ring 3 cells belongs to the gray zone, and the communication system has a minimum signal-to-interference and noise ratio target $SINR_{target}$ of 0 dB. Assuming the lower bound channel quality indictor $CQI_{low}$ of the user equipment in a gray zone cell (cell 32) is 5 dB, cell 32 will send a signal to cell 1 about the lowest channel quality indicator and other counting information. If cell 1 is turned off, expect a 0.1 dB loss on signal-to-interference and noise ratio user equipment in cell 32. If all ring 3 cells of cell 32 (including cell 1, 7, 18, 35, 5, 14, 29) are turned off, this will cause a 1.8 dB total loss on user equipment in cell 32. If the signal-to-interference and noise ratio of user equipment with the lowest channel quality indicator minus the loss of all those ring 3 cells (cells 1, 7, 18, 35, 5, 14, 29) are still above the minimum signal-to-interference and noise ratio target $SINR_{target}$, cell 1 can turn off its transmission.

Figure 11:
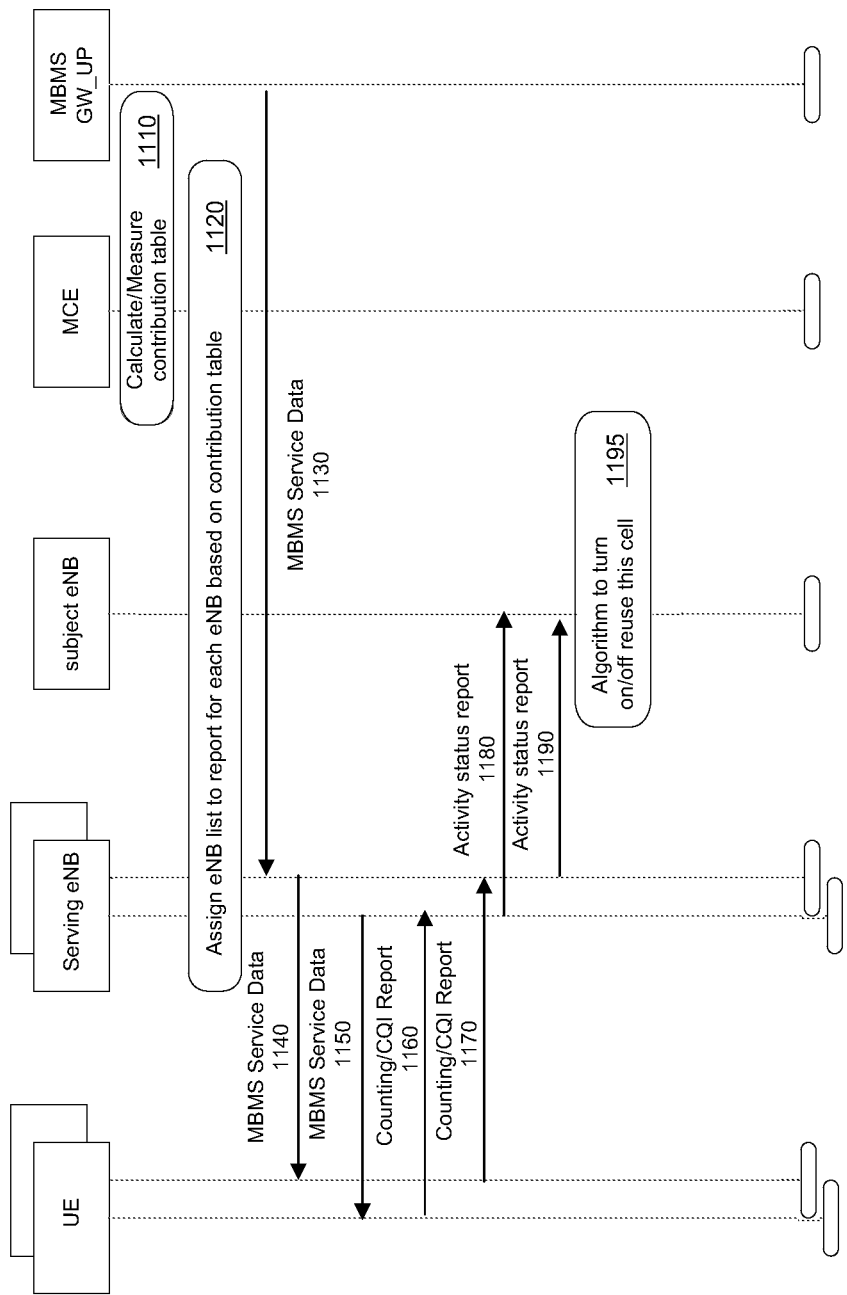
FIGS. 11 and 12 illustrate signaling diagrams demonstrating exemplary operations of a communication system according to the principles of the present invention employing a distributed architecture and a centralized architecture, respectively.
Figure 12:
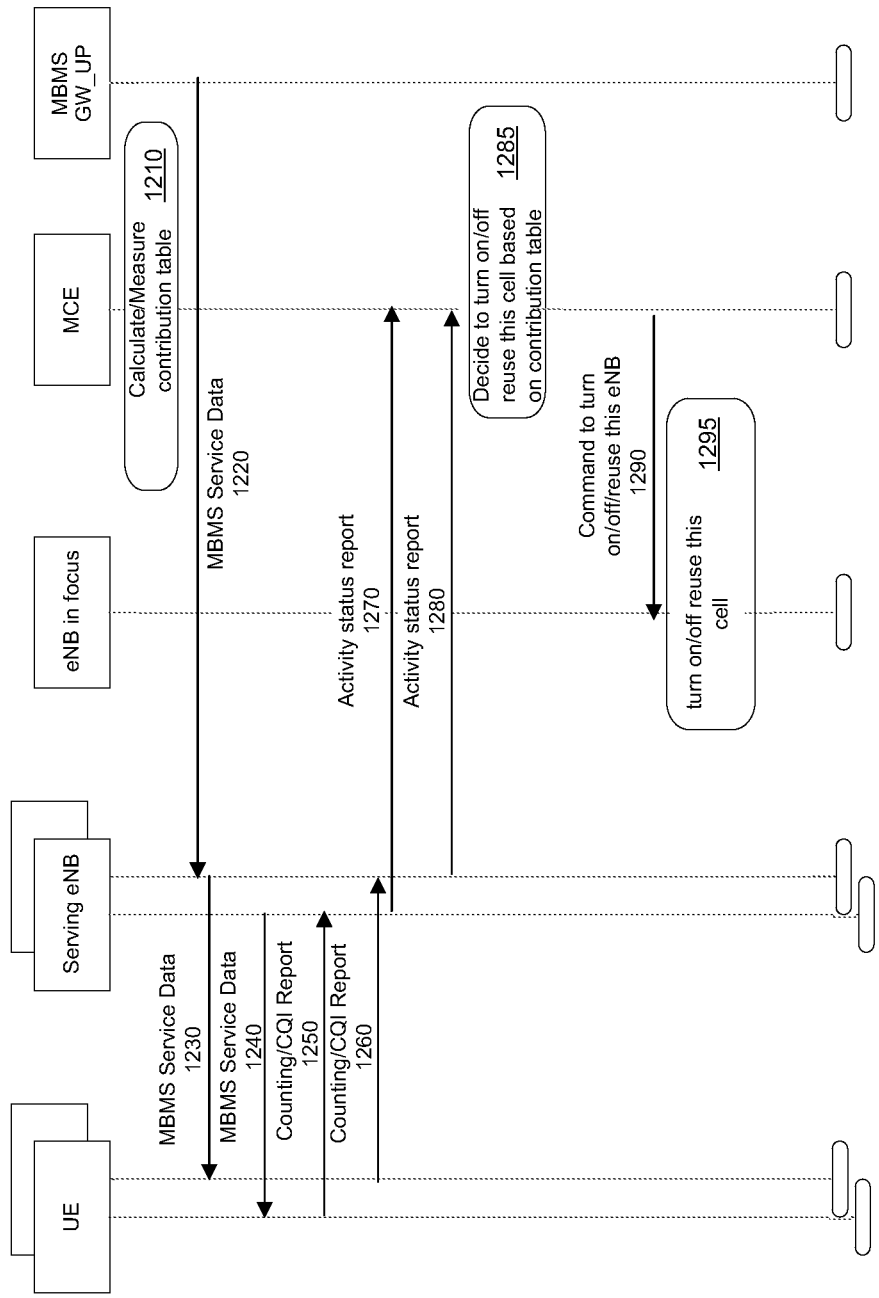

Turning now to FIGS. 11 and 12, illustrated are signaling diagrams demonstrating exemplary operations of a communication system according to the principles of the present invention employing a distributed architecture and a centralized architecture, respectively. The signals for the distributed architecture can be used in light multimedia broadcast and multicast service deployment, while the signals for centralized architecture can be used in a general multimedia broadcast and multicast service deployment.

Regarding the distributed architecture as illustrated in FIG. 11, the communication system is principally operated by each base station. During a configuration phase, the MCE calculates the static contribution table for each base station based on geographical layout of the base stations (designated 1110). This process is similar to neighboring cell list measurement process in UTRAN, which may include a simulation procedure to create the static contribution table, and also include some field measurement experiments to verify/calibrate the static contribution table. Then, the MCE decides for each subject base station a list of base stations whose critical zone or gray zone covers the subject base station (designated 1120). Thereafter, the MCE provides the base station lists to each subject base station.

After multimedia broadcast and multimedia multicast services begin, MBMS GW-UP transmits multimedia broadcast and multicast service data (e.g., a mobile television program) to each base station (designated 1130). Then, each base station broadcasts the multimedia broadcast and multicast service data in bit-identical format (designated 1140, 1150). The user equipment combines the signals from multiple base stations, and decodes the multimedia broadcast and multicast service data. During operation, the user equipment provides counting reports and, potentially, channel quality indicator reports to its serving base station (designated 1160, 1170). Each base station summarizes the counting report and channel quality indicator report from the user equipment to compose an activity status report (an example of which is provided in Table II) (designated 1180, 1190). This activity status report is sent to all base stations in the base station list provided by the MCE. If the channel quality indicator report from the user equipment is not available, the serving base station will not include the channel quality indicator report in the activity status report. Based on the received activity status report, each base station decides whether to turn on/off or reuse the radio resource reserved for multimedia broadcast and multicast service for other purposes (designated 1195). Inasmuch as each base station decides whether to turn on or off, the signaling is sent to the base stations thereby affected.

In a centralized architecture as illustrated in FIG. 12, the MCE is responsible for turning on/off/reuse of the base stations in the communication network. This avoids initial configuration signaling, but results in more signaling between the MCE and base stations after multimedia broadcast and multimedia multicast services begin. Before the session starts, the MCE calculates the contribution table for each base station based on a geographical layout of the base stations (designated 1210). This process is similar to the neighboring cell list measurement process in UTRAN, which may include a simulation procedure to create a static contribution table, and also include some field measurement experiments to verify/calibrate the static contribution table. Then, the MCE decides for each subject base station a list of base stations whose critical zone or gray zone covers the subject base station.

After the multimedia broadcast and multicast service session starts in accordance with the multimedia broadcast and multicast service data (designated 1220, 1230, 1240), the user equipment periodically provides a counting report and, potentially, a channel quality indicator report to its serving base station (designated 1250, 1260). Each base station summarizes the counting and channel quality indicator report to compose an activity status report (designated 1270, 1280). The activity status report is sent to the MCE periodically. If the channel quality indictor report from the user equipment is not available, the serving base station should not include the channel quality indicator information in the summarized activity status report to the MCE. Based on the static contribution tables for each base station and received activity status report, the MCE decides whether a base station should be turned on/off or reused for other purposes (designated 1285). If the MCE decides to change the operation status of one base station, it will send a message to that base station to control its behavior (designated 1290, 1295).

If a base station does not transmit a multimedia broadcast and multimedia multicast services signal, the base station can request the MCE to allow the base station to use the multimedia broadcast and multimedia multicast services frequency spectrum for other resources such as unicast communications. Upon receiving the request, the MCE will check the neighboring cells of the requested base station. If all the neighboring base stations are in an off state, the MCE sends an OKAY command back to the requesting base station to allow the request. If some of the neighboring base stations are in on state but can be turned off, or their transmission powers can be reduced without putting any user equipment below the lower bound for the signal-to-interference and noise ratio $SINR_{low}$, the MCE will first send commands to turn off or reduce the transmission powers of those base stations, and then send OKAY commands back to the requesting base station to allow the request. Otherwise, the MCE will send a NO command back to the requesting base station to deny the request.

In the description above, it is assumed that if all direct neighbors (cells one hop, or one inter-site/base station distance away) are in off state, this cell can be reused to for other purposes such as a unicast communication. Of course, a similar contribution table approach using critical/gray/negligible zones can be employed in lieu of the one hop cell distance. Depending on the objective of reuse (reuse to transmit another multimedia broadcast and multicast service or reuse for other purposes such as for unicast communication), a cell may have a different "critical zone." If all cells in the critical zone are already off, this cell is allowed to reuse its resource for other purposes.

As a result, the communication system may reduce multimedia broadcast and multicast service transmissions while maintaining the service quality. The communication system will also allow base stations without user equipment to use the resources reserved for multimedia broadcast and multicast service for other purposes such as unicast communications or other multimedia broadcast and multimedia multicast services. The communication system further provides for dynamic monitoring and adjusting of the multimedia broadcast and multicast service quality.

Thus, a communication system has been introduced relating to a 3GPP LTE MBSFN communication network and dynamic MBSFN management including a general-level signaling solution adapted to dynamically turn on/off multimedia broadcast and multicast service base stations and reuse the base stations for unicast traffic in mixed carrier multimedia broadcast and multicast service scenario. It is further contemplated to enhance the approach of dynamic single frequency network control with a communication system including a distributed signaling mechanism for dynamic single frequency network control and also taking into account an exemplary 3GPP LTE multimedia broadcast and multicast service network architecture. In addition, the communication system supports a dynamic transmission mode switch (e.g., point-to-multipoint service center ("PtM SC") mode to MBSFN mode or vice versa) in a distributed manner (e.g., without the involvement of an MCE). The dynamic transmission mode switch can also be supported in a light multimedia broadcast and multicast service system (e.g., without a central node). The PtM SC mode refers to a point-to-multipoint single cell mode and MBSFN mode refers to multi-cell transmission mode of multimedia broadcast and multimedia multicast service. The dynamic transmission mode switch refers to switching between the PtM SC and MBSFN modes.

Regarding the 3GPP LTE multimedia broadcast and multicast service network architecture, it may be advantageous to use a centralized radio resource management ("RRM") entity and MCE to control the radio resource allocation in the MBSFN. To do a dynamic single frequency network (e.g., dynamically switch on/off multimedia broadcast and multicast service base stations) or dynamic transmission mode switch, it may become a bottleneck if each base station sends the relevant information (e.g., the activity status report) to the MCE. Hence, it may be advantageous to have a fully distributed signaling mechanism so that necessary information (e.g., the activity status report) can be shared among the base stations. In addition, especially in the initial phase of launching a 3GPP LTE MBMS system, a light multimedia broadcast and multicast service network architecture may be advantageous and also supported by the 3GPP LTE. In the light multimedia broadcast and multicast service system, there may be no specific central node to do radio resource allocation.

In accordance therewith, the communication system may include a distributed signaling mechanism for the purpose of dynamic single frequency network control and transmission mode switch. The communication system may employ a counting technique (e.g., a polling mechanism) for inter-base station signaling, wherein the polled base stations are the base stations in the critical zone and gray zone so that the amount of polled base stations will be relatively small, thereby reducing the signaling load over the M2 interfaces between the base stations. Additionally, the peer-to-peer signaling approach provides an advantage that a base station does not need to address all the base stations in the critical zone and the gray zone, but can actually address the such base stations sequentially until a specific response allows a base station to make a decision on whether or how to transmit the multimedia broadcast and multimedia multicast service. As a result, the signaling load is significantly reduced below values otherwise attainable by some centralized architectures. Not only does the peer-to-peer signaling accommodate the activity status report and on/off status of the base station, but the base station may also maintain reasons for the turn-on/off. Of course, the aforementioned information may be used with other types of signaling mechanisms (e.g., push-type signaling).

A hidden indication of the polling request facilitates dynamic single frequency network control and the transmission mode switch, because the polling request from a base station in the critical zone and the gray zone is an indication that there is no user equipment in the respective cell (e.g., when the base station counting result changes from having greater than zero user equipment to zero user equipment, the base station will start the polling). To simplify the dynamic transmission mode switch at the base station, the following principles may be followed. If through polling/requesting, a base station knows that there is no user equipment in cells associated with base stations in the critical zone and the gray zone, then the base station with multimedia broadcast and multicast service user equipment can change from a MBSFN mode to a PtM SC mode, and informs the base stations in the critical zone and the gray zone without user equipment in their respective cells to stop the multimedia broadcast and multicast service transmission. If a base station starts the multimedia broadcast and multicast service and knows that at least one base station in the critical zone and the gray zone is transmitting the service in a PtM SC mode, then a MBSFN mode may be initiated for the base stations in the critical zone and the gray zone. As a result, the communication system can provide a distributed signaling solution for the dynamic single frequency network control and dynamic transmission mode switch, and can also solve the problem of crashed base stations (e.g., software failures, power failures, etc.).

Compared with the centralized architecture, the communication system employing the distributed architecture and resulting signaling solution can provide several benefits as set forth below. The communication system can be used with the light multimedia broadcast and multicast service deployment (e.g., the MCE functions are located in an operations and maintenance server without an MCE). The communication system will also be more closely aligned with a unicast-LTE architecture. Also, the issue of signaling overhead as a bottleneck over the M2 interfaces in some centralized architectures can be relieved.

The polling request and response messages may be provided as set forth below. An activity status report request message can be generated by a subject base station requesting an activity status report from base stations in the subject base station's critical/gray zone. An activity status report response message includes sending the activity status report to the subject base station. The response message can also contain the reason for an on/off status such as "transmission on, because the user equipment is in a base station's respective cell" or "transmission on, although no user equipment is in a base station's respective cell, but in at least one cell of a base station's critical/gray zone." The activity status report can contain the a base stations identification ("id"), a base station's operations status such as an on/off status, a base station's counting information, and the channel quality indicator feedback of the user equipment with the lowest channel quality indicator.

Figure 13:
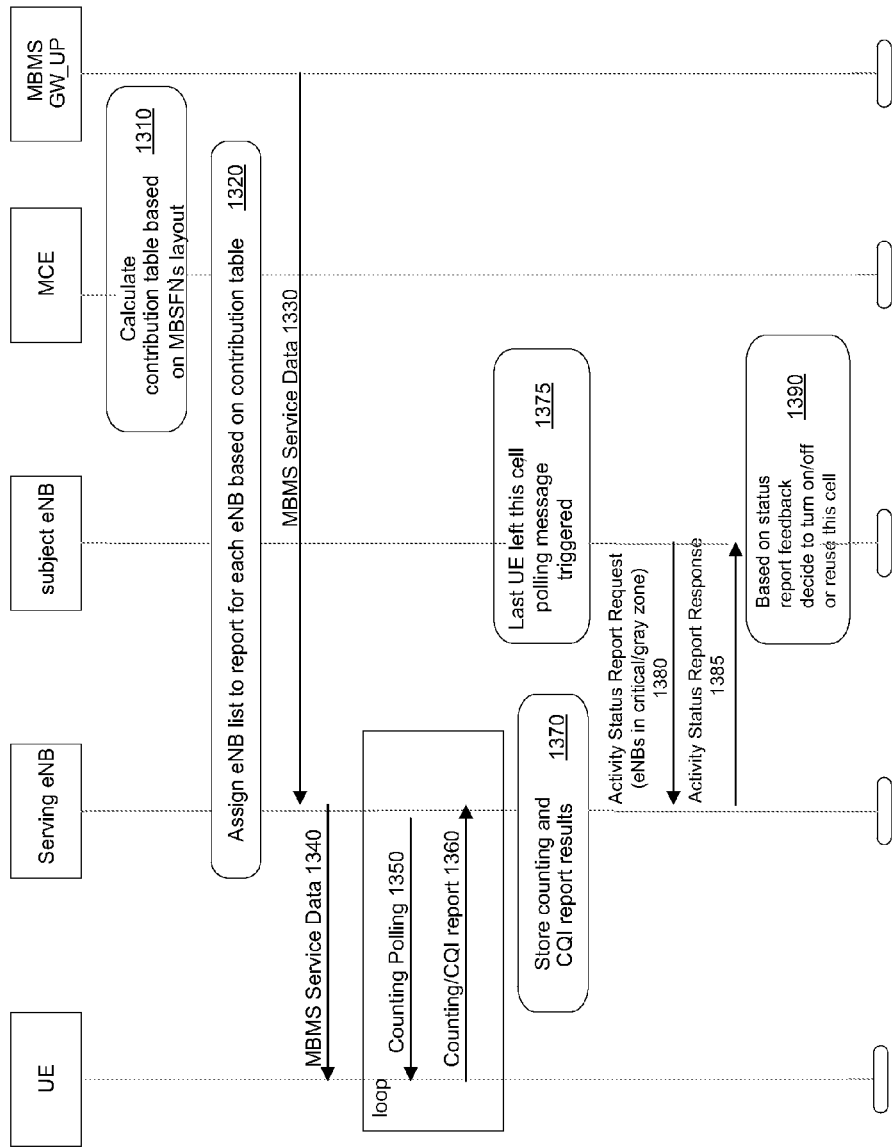
FIGS. 13 to 15 illustrate signaling diagrams demonstrating exemplary operations of a communication system according to the principles of the present invention employing distributed architectures.
Figure 14:
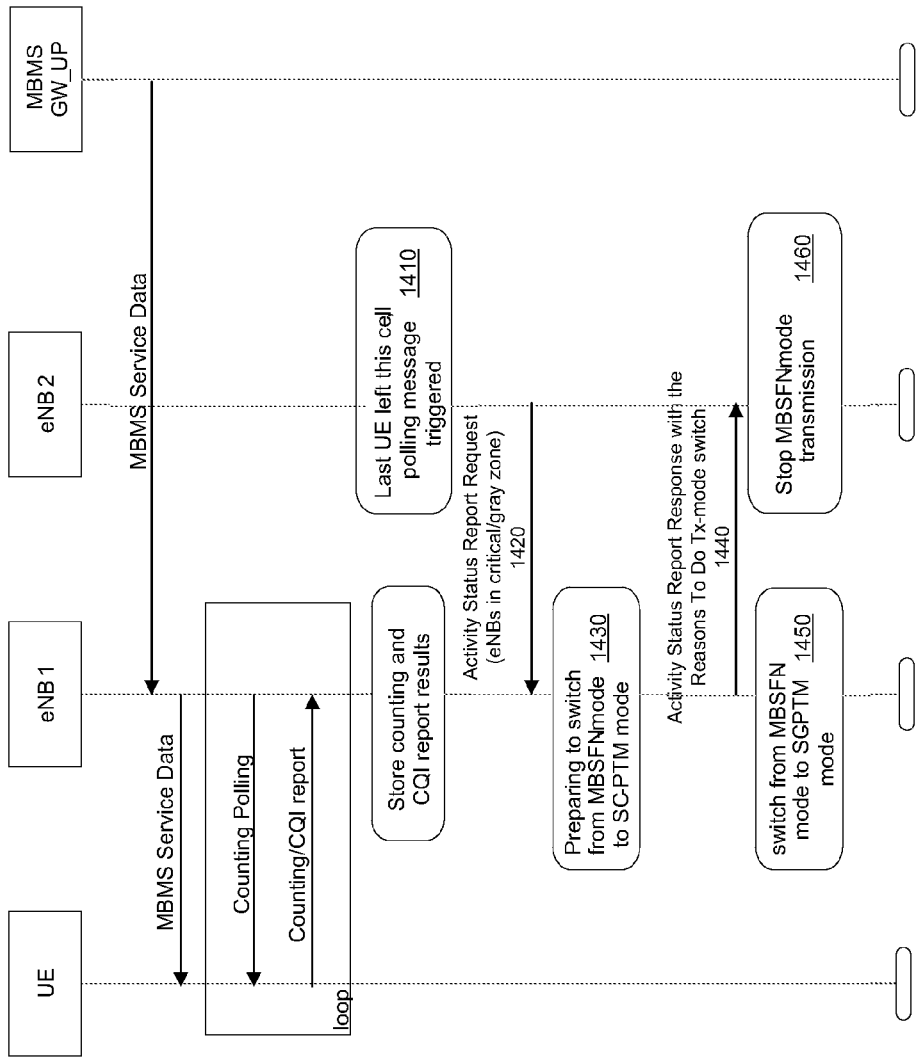
Figure 15:
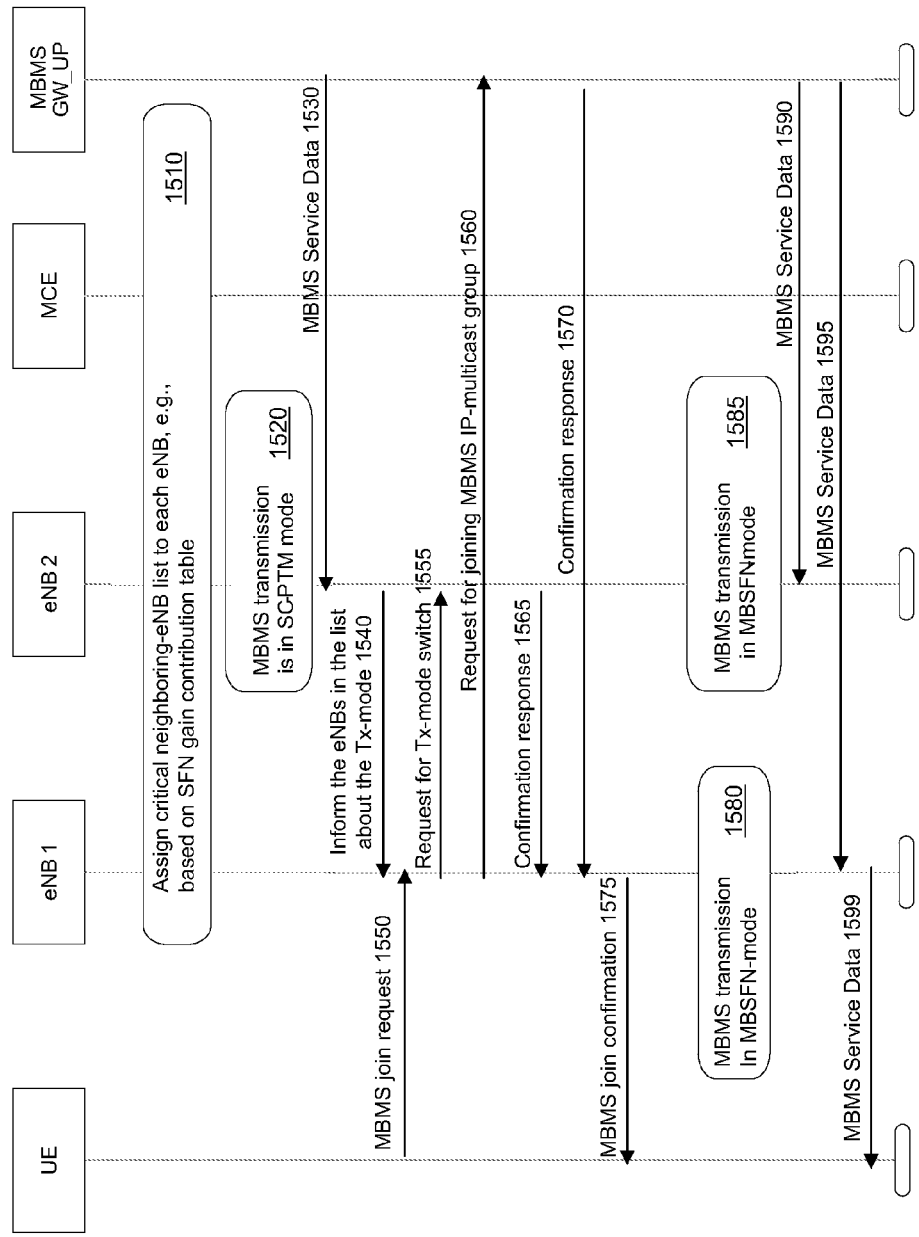

Turning now to FIGS. 13 to 15, illustrated are signaling diagrams demonstrating exemplary operations of a communication system according to the principles of the present invention employing distributed architectures. Referring to FIG. 13, illustrated is a signaling diagram for dynamic single frequency network control in accordance with a communication system of the present invention. During a configuration phase, an MCE calculates the static contribution table based on the MBSFN's layout and makes a base station list of critical zone and gray zone for each base station in the MBSFN (designated 1310). The MCE sends the base station list of critical zone and gray zone to each base station (designated 1320).

After multimedia broadcast and multimedia multicast services begin, MBMS GW-UP transmits multimedia broadcast and multicast service data (e.g., a mobile television program) to each base station (designated 1330). Then, each base station broadcasts the multimedia broadcast and multicast service data in bit-identical format (designated 1340). The user equipment combines the signals from multiple base stations, and decodes the multimedia broadcast and multicast service data. During operation and in accordance with a polling request (designated 1350), the user equipment provides counting reports and, potentially, channel quality indicator reports to its serving base station (designated 1360). Each base station summarizes the counting report and channel quality indicator report from the user equipment to compose an activity status report and stores the information therein (designated 1370).

Whenever a multimedia broadcast and multicast service base station (e.g., the subject base station) finds that the last multimedia broadcast and multicast service user equipment has left its respective cell (e.g., counting result changes from greater than zero user equipment to zero user equipment), the subject base station polls the base stations in the critical zone and gray zone with an activity status report request message (designated 1375, 1380). The base stations in the critical zone and gray zone respond with an activity status report response message (designated 1385). The subject base station does not need to address all of the base stations in the critical zone and gray zone, but can actually address the base stations sequentially until a specific response allows the subject base station to make a decision on whether or how to transmit the multimedia broadcast and multimedia multicast service. For example, if the subject base station has no user equipment within its service area, the request or response from a base station in the critical zone and the gray zone stating that user equipment is located within its service area is enough information to enforce transmission at the subject base station and the subject base station can cease requesting information from other base stations in the critical zone and the gray zone. Based on the received activity status report, each base station decides whether to turn on/off or reuse the radio resource reserved for multimedia broadcast and multicast service for other purposes (designated 1390). Inasmuch as each base station decides whether to turn on or off, the signaling is sent to the base stations thereby affected.

This polling mechanism can be also used by the subject base station in the situation wherein no multimedia broadcast and multicast service user equipment is in its respective cell and the multimedia broadcast and multicast service transmission at the subject base station is kept on for some reason (e.g., "transmission on, although no user equipment is in its own cell, but in at least one cell of the subject base station's critical/gray zone"). In this situation, the subject base station periodically polls the base stations in the critical zone and gray zone and awaits the activity status report response as mentioned above. Due to the periodic polling, an issue of the crashed base stations can be solved, because the lost information of other base stations in the critical zone and gray zone can be retrieved from the polling process. Regarding the case of the counting results changing from zero user equipment to greater than zero user equipment with respect to a subject base station, the subject base station sends out the activity status reports to the base stations in the critical zone and gray zone for use thereby.

Referring to FIG. 14, illustrated is a signaling diagram for a dynamic transmission mode switch (from MBSFN mode to PtM SC mode) in accordance with a communication system of the present invention. The description that follows begins after the multimedia broadcast and multimedia multicast services have commenced and the initial signaling as described above with respect to FIG. 13 is completed. Whenever a multimedia broadcast and multicast service base station (e.g., a second base station eNB 2) finds that the last multimedia broadcast and multicast service user equipment has left its respective cell (e.g., counting result changes from greater than zero user equipment to zero user equipment), the second base station eNB 2 polls the base stations (e.g., a first base station eNB 1) in the critical zone and gray zone with the activity status report request message (designated 1410, 1420).

The first base station eNB 1 checks if there is still a multimedia broadcast and multicast service user equipment in its respective cell and if all base stations in the critical zone and gray zone have also polled the first base station eNB 1. If so (meaning that the other base stations also have no multimedia broadcast and multicast service user equipment), the first base station eNB 1 responds with the activity status report response message to all base stations in the critical zone and gray zone including the reasons to switch from the MBSFN mode to the PtM SC mode (designated 1430, 1440). The first base station eNB 1 then switches from the MBSFN mode to the PtM SC mode and the other base stations in the critical zone and the gray zone cease the MBSFN transmissions (designated 1450, 1460).

Referring to FIG. 15, illustrated is a signaling diagram for a dynamic transmission mode switch (from PtM SC mode to MBSFN mode) in accordance with a communication system of the present invention. During a configuration phase, an MCE assigns the base station list of base stations in the critical zone and gray zone to each base station (designated 1510). This base station list may be based on the static contribution table as explained above.

A second base station eNB 2 transmits in the PtM SC mode, because there are multimedia broadcast and multicast service user equipment in its respective cell and there is no indication from the base stations in the base station list regarding whether such base stations are transmitting in the MBSFN mode or the PtM SC mode (designated 1520). After the multimedia broadcast and multicast service data is transmitted (designated 1530), the second base station eNB 2 informs the base stations in the base station list regarding its transmission mode (designated 1540).

One of such base stations (e.g., a first base station eNB 1) in the base station list receives a multimedia broadcast and multicast service join request from a user equipment (designated 1550). The first base station eNB 1 checks if there are any base stations in the base station list transmitting in the PtM SC mode or the MBSFN mode. To simplify the explanation, we assume that only the second base station eNB2 transmits in the PtM SC mode. Then, the first base station eNB 1 sends a request to the second base station eNB2 to ask for a transmission mode switch (designated 1555). The second base station eNB 2 confirms the request (designated 1565). In addition, the first base station eNB 1 joins the multimedia broadcast and multicast service IP multi-cast group for service data delivery, which is confirmed by the MBMS GW_UP (designated 1560, 1570). The first base station eNB 1 confirms the user equipment's multimedia broadcast and multicast service join request (designated 1575). The first and second base stations eNB 1, eNB 2 transmit in the MBSFN-mode and forms a MBSFN including the first and second base stations eNB 1, eNB 2 (designated 1580, 1585). The multimedia broadcast and multicast service data is delivered from the MBMB GW-UP to the first base station eNB 1, the second base station eNB 2, and the UE via the IP multicast communication (designated 1590, 1595, 1599).

As mentioned above, it was assumed that only second base station eNB2 transmits in the PtM SC mode. If more than one base station is transmitting in the PtM SC mode then the following may occur. Assume that the second base station eNB 2 transmits in the PtM SC mode and a third base station eNB 3 (which is in the base station list for the first base station eNB 1, but not in the base station list for the second base station eNB 2), transmits in the PtM SC mode as well. Then, the first base station eNB 1 requests both the second and third base stations eNB 2, eNB 3 to transmit in the MBSFN mode. In another example, assume that the second base station eNB 2 transmits in the PtM SC mode and the third base station eNB 3 (which is in the base station list for the first base station eNB 1, but not in the base station list for the second base station eNB 2), transmits in the MBSFN mode (referred to as "MBSFN 1" mode). Then, the first base station eNB 1 requests that the second base station eNB 2 join the third base station eNB 3 in the MBSFN 1 mode.

As a result, there is a reduced amount of signaling load over the M2 interface, due to the limited set of base stations in the critical zone and gray zone and due to some additional features (e.g., sequential polling and hidden indication of polling requests) described above. Also, the information message to respond to the polling request contains the reasons for turn-on/off, which can facilitate making the decision at the subject base station whether to turn-on/off or reuse the resources for other resources such as unicast communication or for performing transmission mode switch. The communication system as described above can be used with the light multimedia broadcast and multicast service deployment (e.g., the MCE functions are located in an operations and maintenance server without an MCE) and a better alignment with unicast-LTE architecture. Alternatively, in a light deployment, the MCE functions can be part of the base stations and the rules for MBSFN transmission mode may be pre-configured in the base stations semi-static manner (e.g., via an operations and maintenance system). Additionally, the communication system provides a solution to solve the issue of crashed base stations.

The communication system as described herein, therefore, provides an estimate of a base station's ("cell controller's") contribution to user equipment's MBSFN gain based on that base station's distance to the user equipment's serving base station. Based on the estimated MBSFN gain contribution, the communication system classifies the relation between the serving base station (or, any user equipment within the serving base station) to the subject base station into three zones, namely, the critical zone wherein the MBSFN gain contribution from subject base station is important, the negligible zone wherein the MBSFN gain contribution from subject base station is marginal, and the gray zone wherein the MBSFN gain contribution is in between. Since the estimation is a function of geographical relations between base stations, a static contribution table can be created before the multimedia broadcast and multicast service starts.

The activity status reports exchanged between the communication network elements include, without limitation, the multimedia broadcast and multicast service operation status (e.g., on/off) of the base stations, counting information (e.g., is there any user equipment in service within the service area of the base station), and the multimedia broadcast and multicast service signal quality (e.g., channel quality indicator ("CQI")) of the user equipment with the lowest channel quality in the coverage area of the base station. A base station summarizes the activity status report, and report to those base stations whose critical or gray zone covers the base station (e.g., neighboring base stations).

In order to ensure multimedia broadcast and multicast service quality, a lower bound of received signal-to-interference and noise ratio ("$SINR_{low}$") and channel quality indicator ("$CQI_{low}$") is assumed to be employed by the communication network. The communication system turns base stations on or off as set forth below. If there is at least one user equipment in service (and its serving base station) in the subject base station's critical zone, the subject base station should be kept ON. If all user equipment (and its serving base station) is within the subject base station's negligible zone, the subject base station can be turned off. If no user equipment is in critical zone, but at least one user equipment is in gray zone, whether to turn off subject base station is based on the user equipment with the lowest CQI feedback from the activity status reports. If lowest CQI feedback is better than the channel quality indicator $CQI_{low}$, turn off the subject base station. If lowest CQI feedback is worse than the channel quality indicator CQIlow, turn on the subject base station. If all base stations in the critical zone and the gray zone are in off-state, the subject base station may use or request to use its multimedia broadcast and multicast service resources for other resources such as unicast communication, if needed.

For improvements for allowing distributed coordination among cells for dynamic single frequency network operation, the following functionality for the communication system may be employed. A first participation message (e.g., signaling participation messages) between base stations, to indicate that participation in the single frequency network transmission of a designated multimedia broadcast and multicast service is requested by a subject base station to achieve sufficient combining gain within the respective cell, and another message indicating that such support is no longer needed. As a result, a second participation message (e.g., previously requested participation messages) in the single frequency network transmission of a designated multimedia broadcast and multicast service may not be necessary.

Additionally, a state may be maintained by each base station, per multimedia broadcast and multicast service eligible for single frequency network transmission, that includes information on which base stations are currently counting on (after sending the first participation message mentioned above) the participation thereof in the single frequency network transmission of the multimedia broadcast and multimedia multicast service. Also, a state may be maintained listing base stations that the subject base station has requested to participate in the single frequency network transmission of the multimedia broadcast and multicast service (to know where to transmit the second participation message mentioned above when polling no longer reveals the previously existing user equipment receiving the multimedia broadcast and multimedia multicast service).

In this framework, at any given time a base station should participate in the single frequency network transmission of a multimedia broadcast and multicast service if previous polling has not indicated the absence of user equipment receiving the multimedia broadcast and multicast service in the respective cell or other base stations have requested the multimedia broadcast and multicast service (with the signaling participation message mentioned above) and have not subsequently cancelled that request (with the second participation message mentioned above). Otherwise, the base station and respective cell may reuse the common radio resources reserved for the single frequency network transmission for other purposes such as unicast communications.

A method of handling dynamic single frequency network is summarized as follows. Simultaneous polling by the base stations is occasionally used during the multimedia broadcast and multimedia multicast service, to check if there are no longer receiving user equipment associated with base stations in their respective cells, and to operate accordingly, using the messages and states introduced above. At the start of the multimedia broadcast and multimedia multicast service, the base stations should transmit the service and the first polling should take place shortly thereafter. The initial states should reflect that base stations in the critical zone and the gray zone have requested each other to participate in the transmission of the multimedia broadcast and multimedia multicast service. The mechanism for switching on the single frequency network transmission for base stations is aligned with existing handover mechanisms; the receiving user equipment should send a neighbor cell measurement report when the reception quality (expressed, for instance, in terms of packet error ratio) falls below a given threshold. Based on the measurement report, the subject base station requests appropriate other base stations to switch on the single frequency network transmission. This mechanism also covers the special case wherein a user equipment switches to receive a multimedia broadcast and multicast service that is not yet transmitted (but is advertised) in a cell associated with a base station.

The communication system provides a communication network configuration with lighter control signaling (e.g., less information to be exchanged among base stations), and avoids the ambiguous cases in deciding whether or not a base station should transmit the multimedia broadcast and multimedia multicast service. For instance, in the gray zone case, the definition of the single lower-bound channel quality indicator threshold may be ill-defined and lead to ambiguous cases and/or ping-pong effects.

Thus, the communication system is configured to provide for a dynamic single frequency network (i.e., how to turn on/off reuse multimedia broadcast and multicast service cells). The communication system also uses geographical relationships between base stations to calculate a static contribution table, wherein "static" means that the contribution table does not change due to user equipment movement. The communication system also composes per-cell activity status reports by summarizing counting and channel quality indicator reports from the user equipment. The communication system can use the activity status report and the static contribution table to decide how to turn on/off and reuse cells.

In a distributed architecture (employable with a light multimedia broadcast and multimedia multicast service), the communication system uses the static contribution table to decide a list of base stations in the critical zone and the gray zone thereof to forward the activity status report. The list of base stations in the critical zone and the gray zone is configured in each base station by signaling from a multimedia broadcast and multicast service coordination entity ("MCE"). The base stations forward the activity status report to those base stations in the list of base stations in the critical zone and the gray zone. Using the activity status report and static contribution table configured by the MCE, a base station decides to turn on/off or reuse its resource for other purposes.

In a centralized architecture (employable with a general multimedia broadcast and multimedia multicast service), a static contribution table is created and stored in the MCE. The base stations compose activity status reports from counting information and channel quality indicator information received from user equipment, and periodically reported to the MCE. The MCE decides each base station's operational status based on a static contribution table and received activity status reports. Finally, the MCE commands each base station's behavior (on/off or reuse for other purpose).

The program or code segments making up the various embodiments of the present invention may be stored in a computer readable medium or transmitted by a computer data signal embodied in a carrier wave, or a signal modulated by a carrier, over a transmission medium. The "computer readable medium" may include any medium that can store or transfer information. Examples of the computer readable medium include an electronic circuit, a semiconductor memory device, a ROM, a flash memory, an erasable ROM ("EROM"), a floppy diskette, a compact disk CD-ROM, an optical disk, a hard disk, a fiber optic medium, a radio frequency ("RF") link, and the like. The computer data signal may include any signal that can propagate over a transmission medium such as electronic communication network channels, optical fibers, air, electromagnetic links, RF links, and the like. The code segments may be downloaded via computer networks such as the Internet, Intranet, and the like.

As described above, the exemplary embodiment provides both a method and corresponding apparatus consisting of various modules providing functionality for performing the steps of the method. The modules may be implemented as hardware (including an integrated circuit such as an application specific integrated circuit), or may be implemented as software or firmware for execution by a computer processor. In particular, in the case of firmware or software, the exemplary embodiment can be provided as a computer program product including a computer readable storage structure embodying computer program code (i.e., software or firmware) thereon for execution by the computer processor.

Although the present invention and its advantages have been described in detail, it should be understood that various changes, substitutions and alterations can be made herein without departing from the spirit and scope of the invention as defined by the appended claims. For example, many of the features and functions discussed above can be implemented in software, hardware, or firmware, or a combination thereof.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. An apparatus, comprising:
   at least one processor; and
   at least one memory including computer program code, where the at least one memory and the computer program code are configured, with the at least one processor, to cause the apparatus to at least:
   broadcast at least one of a counting report request and a channel quality indictor report request to user equipment in a service area thereof;
   process at least one of a counting report and a channel quality indicator report received from said user equipment and provide an activity status report therefrom; and
   determine to provide multimedia broadcast and multicast services in said service area thereof as a function of an activity status report from another base station.

2. The apparatus as recited in claim 1, wherein said at least one memory including the computer code is configured with the at least one processor to cause the apparatus to provide said multimedia broadcast and multicast services as a function of an operational status thereof in said service area.

3. The apparatus as recited in claim 1, wherein said at least one memory including the computer code is configured with the at least one processor to cause the apparatus to poll said another base station with an activity status report request message to obtain said activity status report therefrom.

4. The apparatus as recited in claim 1, wherein said at least one memory including the computer code is configured with the at least one processor to cause the apparatus to provide a polling request to said user equipment in accordance with said at least one of said counting report request and said channel quality indictor report request.

5. The apparatus as recited in claim 1, wherein said at least one memory including the computer code is configured with the at least one processor to cause the apparatus to determine to provide said multimedia broadcast and multicast services in said service area thereof as a function of an activity status report from a plurality of base stations.

6. The apparatus as recited in claim 1, wherein said channel quality indicator report provides an indication of a channel quality for said user equipment in relation to a lower bound channel quality indictor for a communication system employing a base station.

7. The apparatus as recited in claim 3, wherein said lower bound channel quality indicator is derived from a user equipment minimum signal-to-interference and noise ratio target plus a margin.

8. The apparatus as recited in claim 1, wherein said at least one memory including the computer code is configured with the at least one processor to cause the apparatus to determine to employ resources of a base station for unicast communications.

9. A method, comprising:
   broadcasting a counting report request and a channel quality indictor report request to user equipment in a service area thereof;
   processing a counting report and a channel quality indicator report received from said user equipment and providing an activity status report therefrom;
   calculating a static contribution table; and
   determining to employ a base station for multimedia broadcast and multicast services in said service area thereof as a function of said static contribution table and said activity status report.

10. The method as recited in claim 9, further comprising providing said multimedia broadcast and multicast services in said service area thereof in accordance with said determining.

11. The method as recited in claim 9, further comprising providing a polling request to said user equipment in accordance with said counting report request and said channel quality indictor report request.

12. The method as recited in claim 9, wherein said channel quality indicator report provides an indication of a channel quality for said user equipment in relation to a lower bound channel quality indictor for a communication system.

13. The method as recited in claim 9, wherein said determining comprises determining to employ resources of said base station for unicast communications.

14. The method as recited in claim 9, further comprising:
   broadcasting another counting report request and another channel quality indictor report request to another user equipment in another service area thereof;
   processing another counting report and another channel quality indicator report received from said another user equipment and providing another activity status report therefrom; and
   determining to employ said another base station for another multimedia broadcast and multicast services in said another service area thereof as a function of said static contribution table and said another activity status report.

15. A non-transitory computer readable medium comprising program code, the program code executed by a processor to perform operations comprising:
   broadcasting at least one of a counting report request and a channel quality indictor report request to user equipment in a service area thereof;
   processing at least one of a counting report and a channel quality indicator report received from said user equipment and provide an activity status report therefrom, and
   determining to provide multimedia broadcast and multicast services in said service area thereof as a function of an activity status report from another base station.

16. The non-transitory computer readable medium as recited in claim 15, further comprising determining to provide said multimedia broadcast and multicast services as a function of an operational status thereof in said service area.

17. A method, comprising:
- broadcasting, with a base station, at least one of a counting report request and a channel quality indictor report request to user equipment in a service area thereof;
- processing at least one of a counting report and a channel quality indicator report received from said user equipment and providing an activity status report therefrom; and
- determining to provide multimedia broadcast and multicast services in said service area thereof as a function of an activity status report from another base station.

18. The method as recited in claim 17, wherein said determining comprises determining to provide said multimedia broadcast and multicast services as a function of an operational status thereof in said service area.

19. The method as recited in claim 17, further comprising polling said another base station with an activity status report request message to obtain said activity status report therefrom.

20. The method as recited in claim 17, wherein said channel quality indicator report provides an indication of a channel quality for said user equipment in relation to a lower bound channel quality indictor for a communication system employing said base station.

21. The method as recited in claim 17, wherein said determining comprises determining to employ resources of said base station for unicast communications.

* * * * *

UNITED STATES PATENT AND TRADEMARK OFFICE
CERTIFICATE OF CORRECTION

PATENT NO. : 8,532,683 B2
APPLICATION NO. : 12/681216
DATED : September 10, 2013
INVENTOR(S) : Henri Markus Koskinen et al.

Page 1 of 1

It is certified that error appears in the above-identified patent and that said Letters Patent is hereby corrected as shown below:

In the Claims:

In Claim 1:
Column 25, line 33, "indictor" should be --indicator--.

In Claim 6:
Column 25, line 66, "indictor" should be --indicator--.

In Claim 11:
Column 26, line 29, "indictor" should be --indicator--.

In Claim 12:
Column 26, line 33, "indictor" should be --indicator--.

In Claim 14:
Column 26, line 39, "indictor" should be --indicator--.

In Claim 15:
Column 26, line 54, "indictor" should be --indicator--.

In Claim 17:
Column 27, line 3, "indictor" should be --indicator--.

In Claim 20:
Column 27, line 23, "indictor" should be --indicator--.

Signed and Sealed this
Twenty-sixth Day of November, 2013

Margaret A. Focarino
*Commissioner for Patents of the United States Patent and Trademark Office*